US007024206B2

(12) United States Patent
Hamanaga et al.

(10) Patent No.: US 7,024,206 B2
(45) Date of Patent: Apr. 4, 2006

(54) MOBILE TERMINAL APPARATUS CAPABLE OF RESUMING AN INTERRUPTED APPLICATION

(75) Inventors: Ayaka Hamanaga, Hiroshima (JP); Tadakatsu Masaki, Urasoe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/516,359

(22) PCT Filed: Apr. 20, 2004

(86) PCT No.: PCT/JP2004/005631

§ 371 (c)(1), (2), (4) Date: Dec. 1, 2004

(87) PCT Pub. No.: WO2004/095813

PCT Pub. Date: Nov. 4, 2004

(65) Prior Publication Data

US 2005/0176460 A1 Aug. 11, 2005

(30) Foreign Application Priority Data

Apr. 24, 2003 (JP) ............................ 2003-120550

(51) Int. Cl.
*H01Q 7/20* (2006.01)

(52) U.S. Cl. ...................................................... 455/456

(58) Field of Classification Search ................. 455/456
See application file for complete search history.

(56) References Cited

U.S. PATENT DOCUMENTS

2002/0119768 A1 8/2002 Matsumoto et al.

FOREIGN PATENT DOCUMENTS

| | | |
|---|---|---|
| EP | 0 895 383 | 2/1999 |
| GB | 2 361 391 | 10/2001 |
| JP | 11-331349 | 11/1999 |

*Primary Examiner*—William D. Cumming
(74) *Attorney, Agent, or Firm*—Wenderoth, Lind & Ponack, L.L.P.

(57) ABSTRACT

A mobile terminal apparatus acquires resume information concerning an application which is being executed and identification information, which is selected by a user, related to the application. The identification information identifies a communications device communicating with the mobile terminal apparatus. A communication is performed with the communications device by using the identification information and whether the communication has been interrupted is determined. If it is determined that the communication has been interrupted, interruption information is generated including the identification information. The interruption information and the resume information concerning the application related to the interrupted communication are stored in association with each other. A history of interrupted communications is displayed based on the stored interruption information, and if the interrupted communication is instructed to be resumed, the communication is resumed based on the stored interruption information and the application is reactivated based on the resume information associated with the interruption information.

15 Claims, 22 Drawing Sheets

F I G. 1
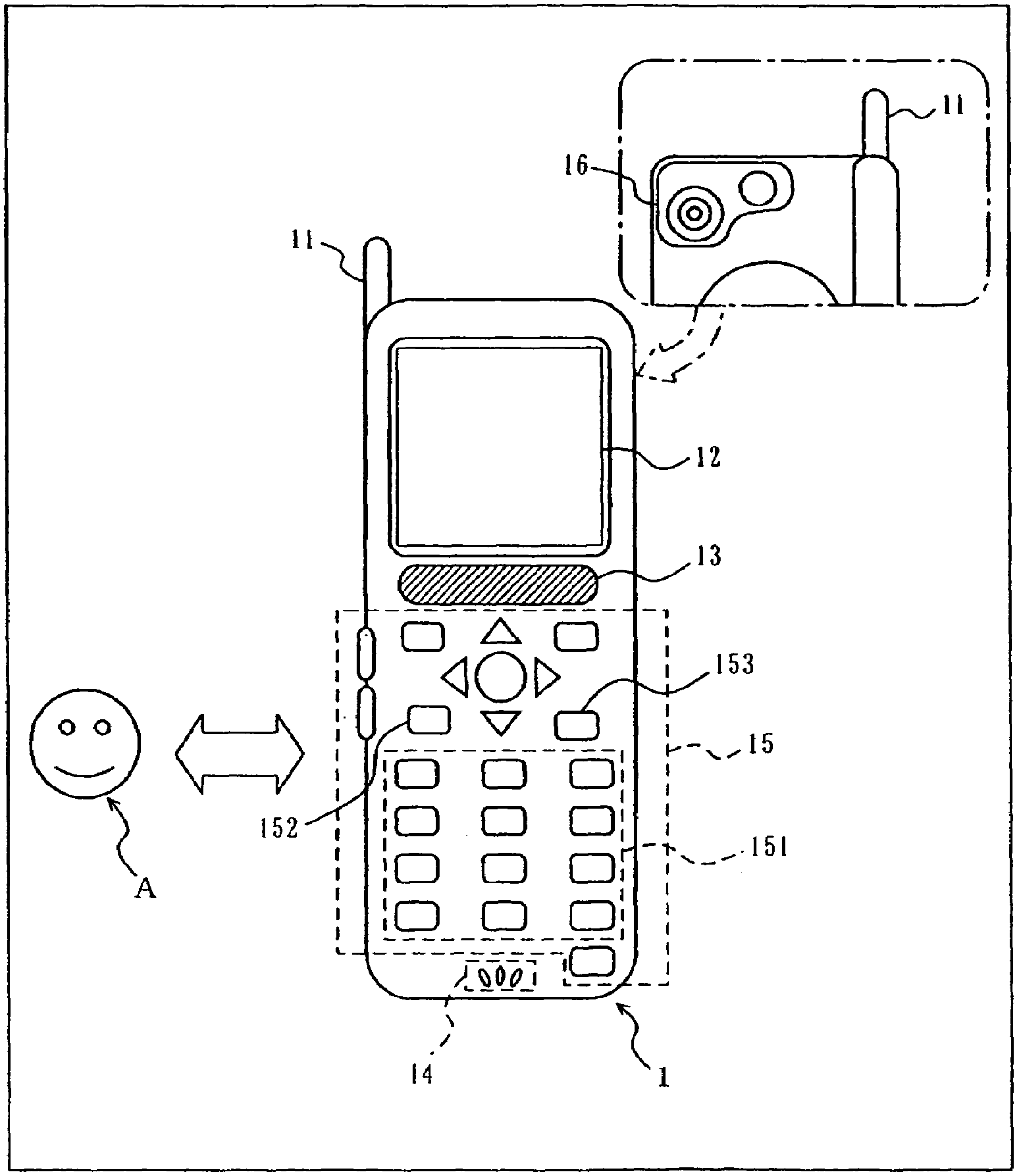

INTERRUPTION INFORMATION

| CONNECTION DESTINATION R11 | TIME OF CALLING R12 | SPENT TIME R13 | LOCATION R14 | | AMBIENT INFORMATION R15 | INTERRUPTION REASON R16 (INTERRUPTION ID) | HISTORY INFORMATION R17 | |
|---|---|---|---|---|---|---|---|---|
| | | | LONGITUDE COORDINATE | LATITUDE COORDINATE | | | | |
| 090 1234-0000 | 18:14 | 2 sec | 35 | 135 | — | 1 | 001.his | R1 |
| 090 0000-1111 | 22:00 | 7 sec | 40.49 | 140.45 | 001.avi | 0 | 002.his | R1 |
| ⋮ | ⋮ | ⋮ | ⋮ | ⋮ | ⋮ | ⋮ | ⋮ | |
| 080 9876-5432 | 8:26 | 18 sec | 34.23 | 132.27 | 002.avi | 2 | 003.his | R1 |

F I G. 4
| APPLICATION NAME | APPLICATION IDENTIFIER | ACTIVATION METHOD V12 (ID) | ACTIVATION CONDITION V13 (ID) |
| --- | --- | --- | --- |
| MAILER | 0 | 0 | 1 |
| BROWSER | 1 | 1 | 1 |
| GAME PROGRAM | 2 | 1 | 0 |
S1 S1 S1
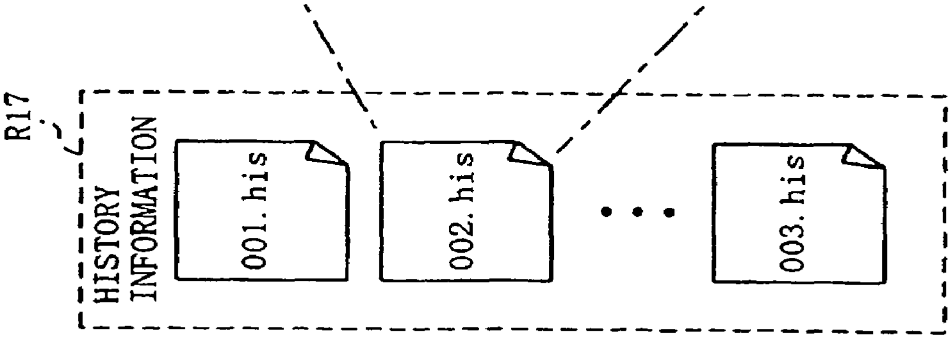

F I G. 6
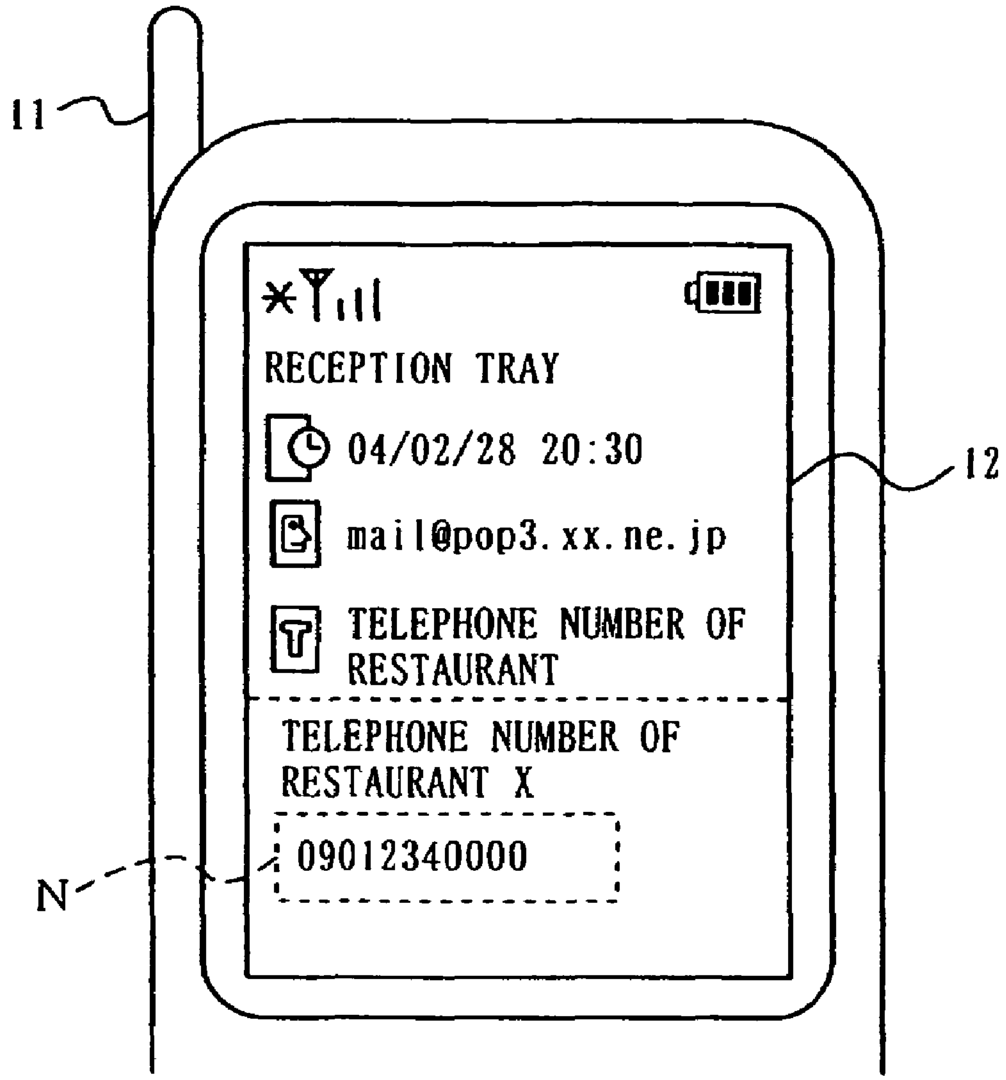

F I G. 1 0
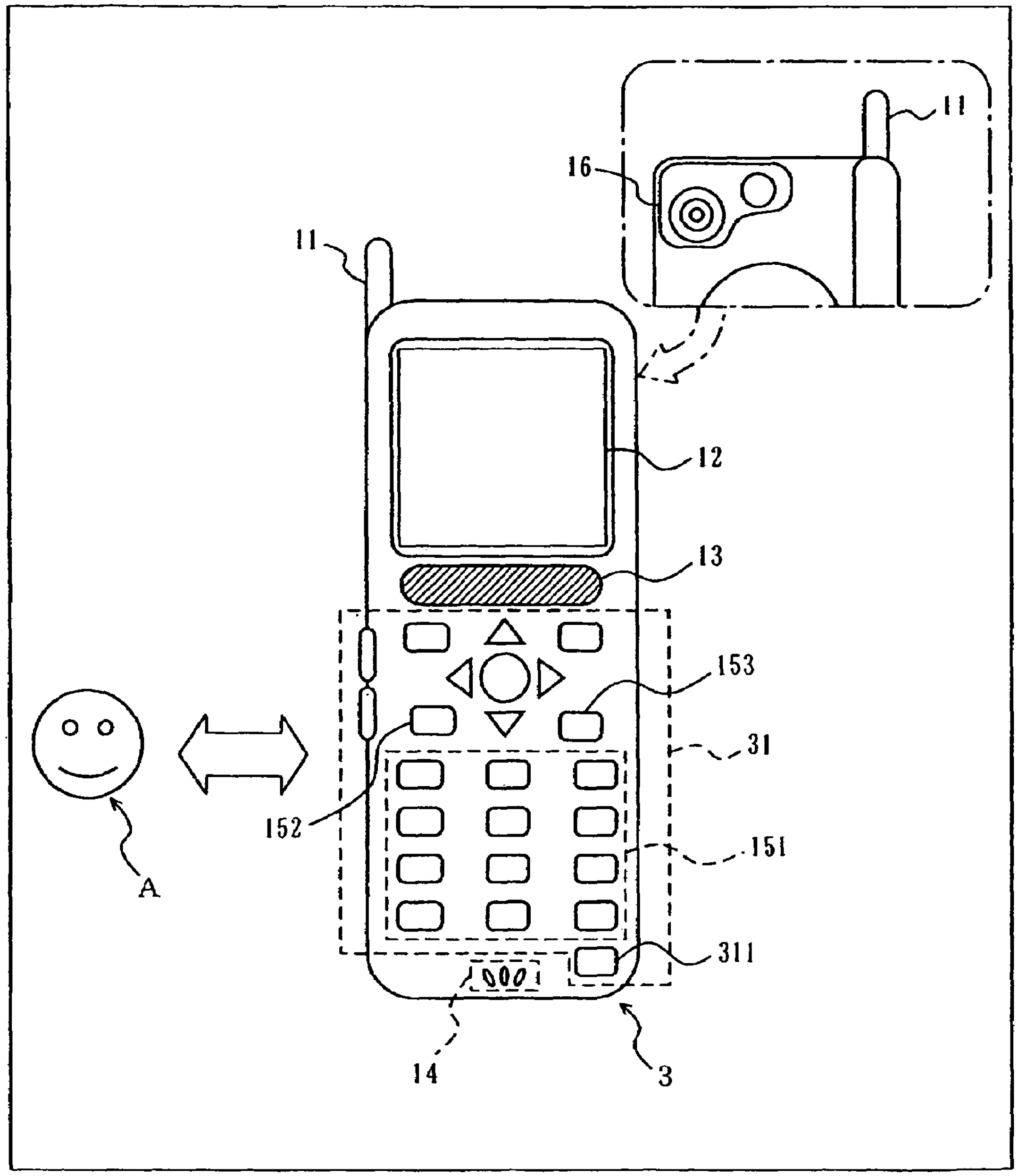

INTERRUPTION INFORMATION

| CONNECTION DESTINATION R11 | TIME OF CALLING R12 | SPENT TIME R21 | LOCATION R14 | | AMBIENT INFORMATION R15 | INTERRUPTION REASON R22 (INTERRUPTION ID) | HISTORY INFORMATION R17 | |
|---|---|---|---|---|---|---|---|---|
| | | | LONGITUDE COORDINATE | LATITUDE COORDINATE | | | | |
| 090 1234-0000 | 18:14 | 2 min | 35 | 135 | — | 1 (SECOND INTERRUPTION REASON | 001.his | R2 |
| 090 0000-1111 | 22:00 | 1 min | 40.49 | 140.45 | 001.avi | 0 (FIRST INTERRUPTION REASON | 002.his | R2 |
| • • • | • • • | • • • | • • • | • • • | • • • | • • • | • • • | |
| 080 9876-5432 | 8:26 | 18 sec | 34.23 | 132.27 | 002.avi | 2 (THIRD INTERRUPTION REASON | 003.his | R2 |

F I G. 1 5
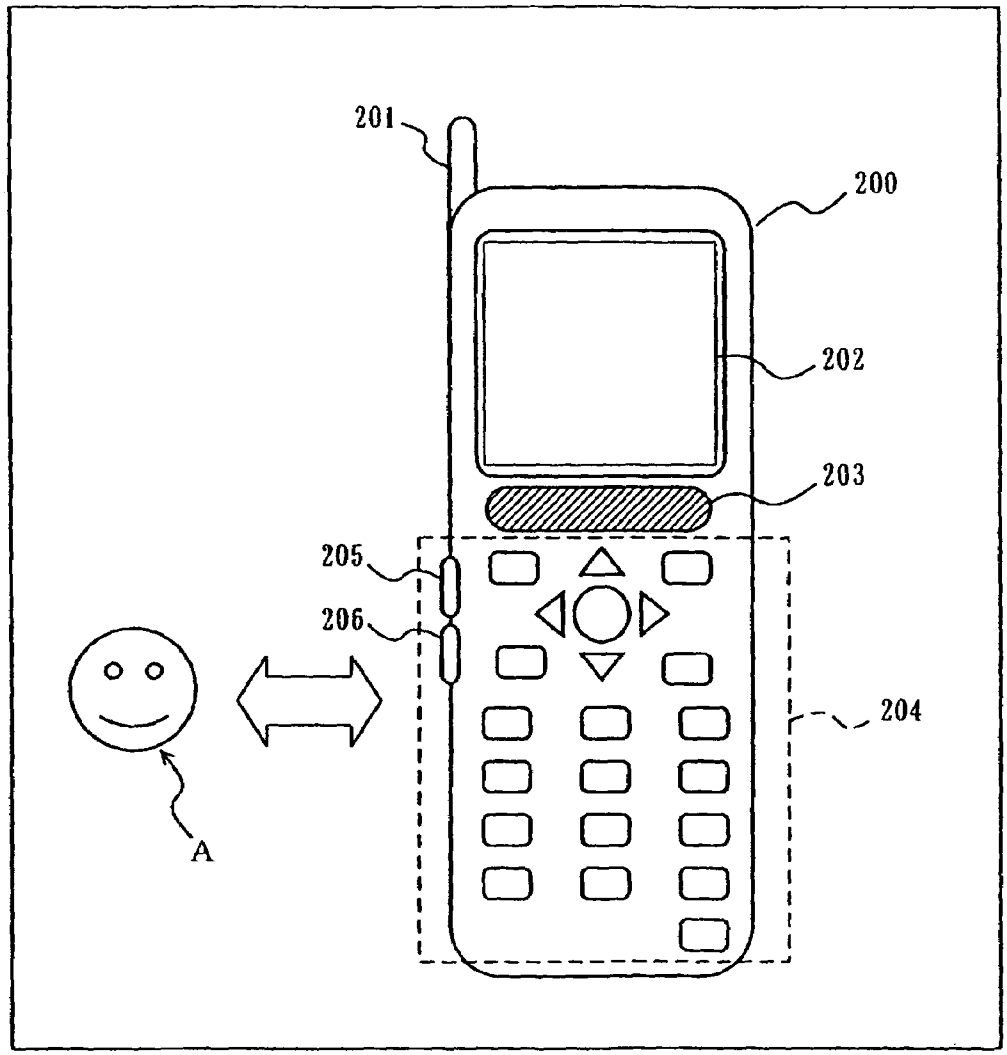

| | 401 APPLICATION CONTEXT | 402 RESUMING MENU LEVEL | 403 ALARMING DATE | 404 ALARMING TIME | 405 ALARMING METHOD |
|---|---|---|---|---|---|
| 410 | MAIL CONTEXT | CREATE ADDRESS | 2003/03/06 | 18:00 | BUZZER 1 |
| 411 | REDIAL CONTEXT | INPUT TELEPHONE NUMBER | 2003/03/14 | 16:30 | SOUND EFFECT 3 |
| 412 | SCHEDULE CONTEXT | INPUT SCHEDULE MEMO | 2003/03/11 | 13:00 | MELODY 5 |
| 413 | TELEPHONE DIRECTORY CONTEXT | REGISTER TELEPHONE DIRECTORY INPUT READING | 2003/03/08 | 20:00 | ORIGINAL MELODY |

MOBILE TERMINAL APPARATUS CAPABLE OF RESUMING AN INTERRUPTED APPLICATION

TECHNICAL FIELD

The present invention relates to a mobile terminal apparatus, and more particularly to a mobile terminal apparatus which is capable of providing information for a user to refer to when performing a resumed communication.

BACKGROUND ART

In conventional mobile terminal apparatuses, the following technique exists which is related to a redial function, which is a type of resumed communication. The user selects an automatic re-calling function by performing key operations on a mobile terminal apparatus. In a state where automatic re-calling is selected, if the mobile terminal apparatus finds that no channel is available for a communication with a base station when the mobile terminal apparatus has placed a call, the mobile terminal apparatus stores the telephone number used for the current call. Thereafter, upon receiving a signal denying channel assignment from a base station, the mobile terminal apparatus activates an internal timer. If the time as counted by this timer coincides with a previously set re-calling period, the mobile terminal apparatus again places a call by using the currently stored telephone number.

Conventional mobile terminal apparatuses merely perform an automatic re-calling after the lapse of a re-calling period. However, there exists a problem in that the user cannot easily remember why the mobile terminal apparatus is performing a re-calling. Such a problem becomes more pronounced as the time till re-calling becomes longer. Hereinafter, a specific example illustrating this problem will be described. Assuming that the user uses a conventional mobile terminal apparatus to make a telephone call to a restaurant which the user found on the Internet, in order to make a reservation. If the first call falls through, the mobile terminal apparatus performs an automatic re-calling after the lapse of a re-calling period. Even if the user gets connected through this re-calling, the user may not be able to immediately remember why the mobile terminal apparatus is performing a re-calling.

When performing a re-calling with a commonly-used mobile terminal apparatus, the user would refer to a list of telephone numbers which were called in the past. By merely referring to such telephone numbers, the user may not be able to remember why the user placed the telephone call in the first place.

DISCLOSURE OF THE INVENTION

Therefore, an object of the present invention is to provide a mobile terminal apparatus which makes it easier for a user to remember why a past communication was performed.

To achieve the above object, a first aspect of the present invention is directed to a mobile terminal apparatus capable of executing an application and performing a communication related to the application, comprising: a first acquisition section operable to acquire resume information concerning an application which is being executed; a second acquisition section operable to acquire identification information, which is selected by a user, related to the application which is being executed, the identification information identifying a communications device communicating with the mobile terminal apparatus; a communication processing section operable to perform a communication with the communications device by using the identification information acquired by the second acquisition section; a determination section operable to determine whether the communication by the communication processing section has been interrupted; a generation section operable to, if the determination section determines that the communication by the communication processing section has been interrupted, generate interruption information including the identification information; a storage section operable to store the interruption information and the resume information concerning the application related to the interrupted communication, such that the interruption information and the resume information are stored in association with each other; a display section operable to display a history of interrupted communications based on the stored interruption information; and a reactivation section operable to, if the interrupted communication is instructed to be resumed, resume the communication based on the stored interruption information and reactivate the application based on the resume information associated with the interruption information, the resume and the reactivation being performed in conjunction with each other.

Preferably, the interruption information comprises auxiliary information concerning the application related to the interrupted communication, and the display section displays the history of interrupted communications together with the auxiliary information.

Alternatively, it is preferable that the interruption information comprises auxiliary information concerning the interrupted communication, and the display section displays the history of interrupted communications together with the auxiliary information.

Preferably, the auxiliary information includes a time concerning the interrupted communication, and/or a place where the communication was interrupted.

Preferably, the mobile terminal apparatus further comprises a timer section operable to keep a current time, wherein the generation section is operable to generate the interruption information comprising the auxiliary information, the auxiliary information representing a point in time at which the communication processing section began processing, based on the current time kept by the timer section.

Preferably, the mobile terminal apparatus further comprises: a timer section operable to keep a current time; and an input section to be operated by the user in order to interrupt the communication performed by the communication processing section, wherein the generation section is operable to generate the interruption information comprising the auxiliary information, the auxiliary information representing a time spent from the beginning of the processing by the communication processing section until the interruption of the processing in response to the input section being operated, based on the current time kept by the timer section.

Preferably, the mobile terminal apparatus further comprises a locating section operable to acquire a current location, wherein the generation section is operable to generate the interruption information comprising the auxiliary information, the auxiliary information representing a place at which the processing by the communication processing was interrupted, based on the current location acquired by the locating section.

In accordance with the resume information stored in the storage section, the reactivation section may reactivate the application from a state which existed immediately before the interruption of the processing by the communication processing section.

In accordance with the resume information stored in the storage section, the reactivation section may reactivate the application anew from the beginning.

The determination section may be operable to determine whether a connecting process with the communications device has been interrupted, and the generation section may be operable to generate the interruption information if the determination section determines that the connecting process has been interrupted.

The determination section may determine whether a voice communication process with the communications device has been interrupted, and the generation section maybe operable to generate the interruption information if the determination section determines that the voice communication process has been interrupted.

A second aspect of the present invention is directed to a method capable of executing an application and performing a communication related to the application on a mobile terminal apparatus, comprising: a first acquisition step of acquiring resume information concerning an application which is being executed; a second acquisition step of acquiring identification information, which is selected by a user, related to the application which is being executed, the identification information identifying a communications device communicating with the mobile terminal apparatus; a communication processing step of performing a communication with the communications device by using the identification information acquired in the second acquisition step; a determination step of determining whether the communication in the communication processing step has been interrupted; a generation step of, if it is determined in the determination step that the communication in the communication processing step has been interrupted, generating interruption information including the identification information; a storage step of storing the interruption information and the resume information concerning the application related to the interrupted communication, such that the interruption information and the resume information are stored in association with each other; a displaying step of displaying a history of interrupted communications based on the stored interruption information; and a reactivation step of, if the interrupted communication is instructed to be resumed, resuming the communication based on the stored interruption information and reactivating the application based on the resume information associated with the interruption information, the resume and the reactivation being performed in conjunction with each other.

A third aspect of the present invention is directed to a computer program executed by a mobile terminal apparatus capable of executing an application and performing a communication related to the application, comprising: a first acquisition step of acquiring resume information concerning an application which is being executed; a second acquisition step of acquiring identification information, which is selected by a user, related to the application which is being executed, the identification information identifying a communications device communicating with the mobile terminal apparatus; a communication processing step of performing a communication with the communications device by using the identification information acquired in the second acquisition step; a determination step of determining whether the communication in the communication processing step has been interrupted; and a generation step of, if it is determined in the determination step that the communication in the communication processing step has been interrupted, generating interruption information including the identification information, wherein, the interruption information and the resume information concerning the application related to the interrupted communication are stored in a storage device comprised by the mobile terminal apparatus, such that the interruption information and the resume information are stored in association with each other, and based on the stored interruption information, a history of interrupted communications is displayed on a display device comprised by the mobile terminal apparatus, the computer program further comprising: a reactivation step of, if the interrupted communication is instructed to be resumed, resuming the communication based on the stored interruption information and reactivating the application based on the resume information associated with the interruption information, the resume and the reactivation being performed in conjunction with each other.

The computer program may be recorded on a recording medium.

A fourth aspect of the present invention is directed to an integrated circuit mountable to a mobile terminal apparatus capable of executing an application and performing a communication related to the application, the integrated circuit comprising: a first acquisition section operable to acquire resume information concerning an application which is being executed; a second acquisition section operable to acquire identification information, which is selected by a user, related to the application which is being executed, the identification information identifying a communications device communicating with the mobile terminal apparatus; a communication processing section operable to perform a communication with the communications device by using the identification information acquired by the second acquisition section; a determination section operable to determine whether the communication by the communication processing section has been interrupted; and a generation section operable to, if the determination section determines that the communication by the communication processing section has been interrupted, generate interruption information including the identification information, wherein, the interruption information and the resume information concerning the application related to the interrupted communication are stored in a storage device comprised by the mobile terminal apparatus, such that the interruption information and the resume information are stored in association with each other, and based on the stored interruption information, a history of interrupted communications is displayed on a display device comprised by the mobile terminal apparatus, the integrated circuit further comprising: a reactivation section operable to, if the interrupted communication is instructed to be resumed, resume the communication based on the interruption information stored in the storage device and reactivate the application based on the resume information associated with the interruption information, the resume and the reactivation being performed in conjunction with each other.

According to the first to fourth aspects above, if a communication with a communications device with which the mobile terminal apparatus is communicating is interrupted, resume information concerning an application which was being executed before the interruption of the communication and interruption information are at least generated, in preparation for a situation where a communication with that communications device is to be performed again. After displaying a history of communications in accordance with such interruption information, the present mobile terminal apparatus reactivates the application in accordance with the resume information. Thus, the user refers to the history of communications, which would be helpful for remembering the situation where a past communication was being performed with the communications device, and thereafter performs a communication again. As is clear from the above, according to the first to fourth aspects, the user can easily remember why a past communication was performed.

Another aspect is directed to a mobile terminal apparatus which is capable of executing an application program, comprising: an interrupted application detection section operable to detect an interruption instruction from a user for an application program which is being executed; resume location information to provide a point from which to resume an application program for which the interruption instruction was given; an alarm setting section operable to generate alarm information comprising a resume time; a timer management section operable to generate timer interruptions with predetermined intervals and notify when a resume date and time according to the alarm information has been reached; an interrupted application controlling section operable to solely manage the alarm information generated by the alarm setting section, and in response to receiving a notification from the timer management section that the application resume time has been reached, give a resume instruction for the application program by referring to the alarm information; an alarm section operable to notify the user of a resume of the application program; and an interrupted application resuming section operable to, in response to the notification from the timer management section, resume the application by referring to the alarm information which has been set in accordance with the user's instruction.

The aforementioned other aspect of the present invention can be realized in the form of a method, a computer program, or an integrated circuit.

According to the aforementioned other aspect, when resuming a once-interrupted application, the user's trouble and time for looking for a relevant menu item from a deep-hierarchy menu of the mobile terminal apparatus can be saved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram illustrating an exemplary outer structure of a mobile terminal apparatus 1 according to a first embodiment of the present invention.

FIG. 3 is a schematic diagram illustrating an exemplary data structure of interruption information Q1 shown in FIG. 2.

FIG. 4 is a schematic diagram illustrating an exemplary data structure of a subunit S1 included in history information R17 shown in FIG. 3.

FIG. 6 is a schematic diagram illustrating an exemplary displayed image of a result of executing a mailer P2 shown in FIG. 2.

FIG. 10 is a schematic diagram illustrating an exemplary outer structure of a mobile terminal apparatus 3 according to a second embodiment of the present invention.

FIG. 12 is a schematic diagram illustrating an exemplary data structure of interruption information Q2 shown in FIG. 11.

FIG. 15 is a diagram illustrating an outer look of a cellular phone 200, as an example of the mobile terminal apparatus according to the third embodiment of the present invention.

FIG. 20 is a diagram showing a data structure of alarm information used in the cellular phone 200 shown in FIG. 15 and FIG. 16.

BEST MODE FOR CARRYING OUT THE INVENTION

FIRST EMBODIMENT

Figure 2:
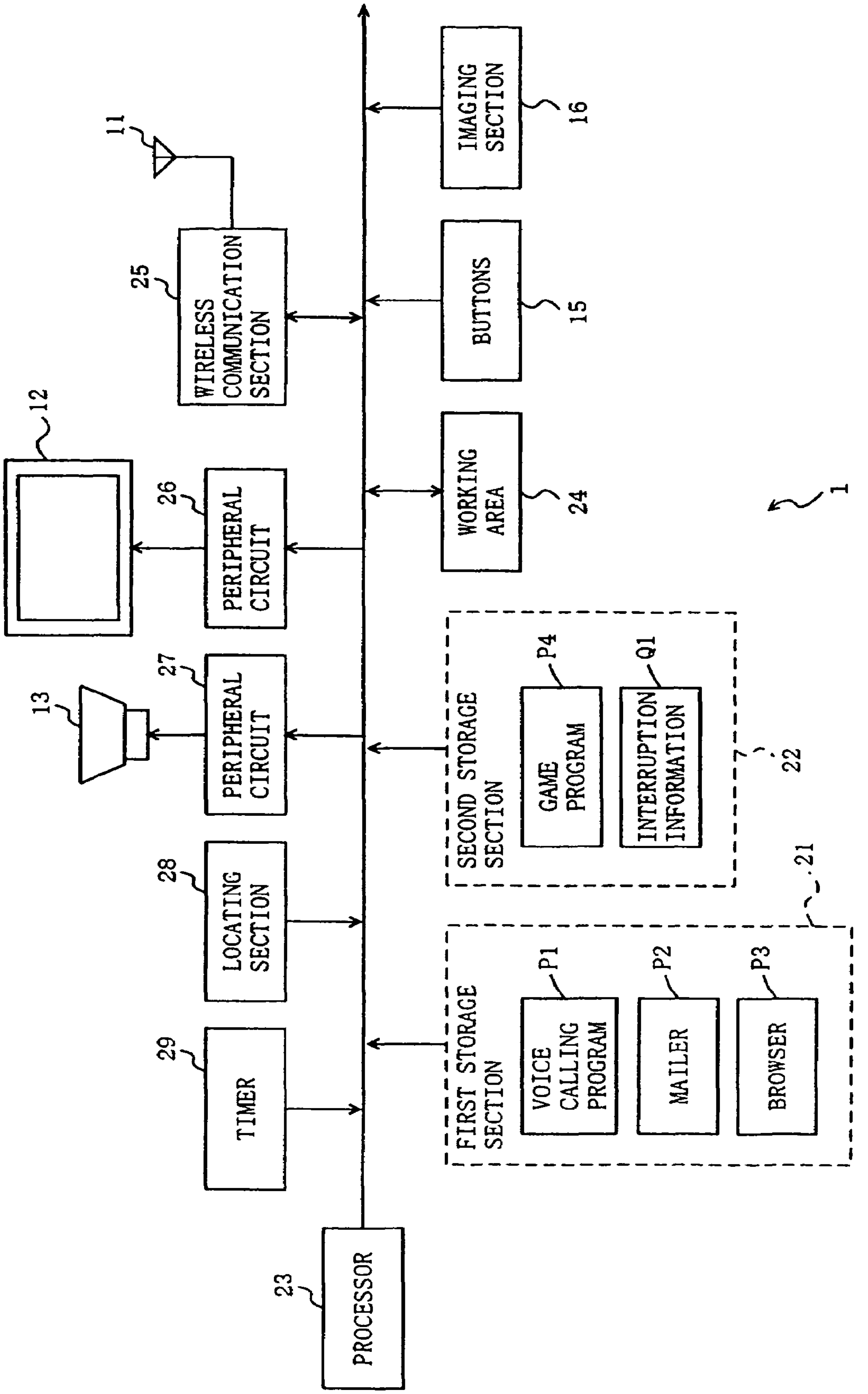
FIG. 2 is a block diagram illustrating an exemplary hardware configuration of the mobile terminal apparatus 1 shown in FIG. 1.

FIG. 1 is a schematic diagram illustrating an outer structure of a mobile terminal apparatus 1 according to a first embodiment of the present invention. In FIG. 1, the mobile terminal apparatus 1 is, for example, a device which allows a user A to make voice calls on the go. A typical example of such a mobile terminal apparatus 1 is a cellular phone. The mobile terminal apparatus 1 comprises an antenna 11, a display 12, a loudspeaker 13, a microphone 14, buttons 15, and an imaging section 16. In the present embodiment, the imaging section 16 is shown enclosed by a dot-dash line, since the following description will illustrate the imaging section 16 as being provided on the back side of the present mobile terminal apparatus 1.

The antenna 11 receives an electrical signal which comes propagated through space, or sends out an electrical signal into space.

The display 12 displays an image on a display screen.

The loudspeaker 13 mainly outputs the content of speech made by the other party of the voice call of the user A as audio.

The microphone 14 converts the content of speech made by the user A (i.e., audio) into an audio signal.

The buttons 15 include a number of buttons to be operated by the hands of the user A. These buttons at least include buttons 151 for inputting a telephone number, a start button 152 for starting a call, and a hang-up button 153 for disconnecting the voice call.

The imaging section 16 takes an image representing a scene of the surroundings of the present mobile terminal apparatus 1 as digital information.

FIG. 2 is a block diagram illustrating an exemplary hardware configuration of the mobile terminal apparatus 1 shown in FIG. 1. For reference sake, FIG. 2 also shows the elements 11 to 16 shown in FIG. 1. In FIG. 2, in addition to the elements 11 to 16, the mobile terminal apparatus 1 is shown to comprise a first storage section 21, a second storage section 22, a processor 23, a working area 24, a wireless communication section 25, a peripheral circuit 26 for a display 12, a peripheral circuit 27 for the loudspeaker 13, a locating section 28, and a timer 29.

The first storage section 21, which is a memory at least permitting reading of data that is stored therein, and at least stores a voice calling program P1, a mailer P2, and a browser P3. The voice calling program P1 is an application program describing processes related to voice calls. The mailer P2 is an application program describing processes related to e-mail. The browser P3 is an application program which realizes access to the WWW (World Wide Web).

The second storage section 22, which is a non-volatile memory permitting rewriting of data, stores computer programs which are downloaded from a WWW server (not shown). In the illustrated example, one application program P4 for a game (simply shown as a "game program" in the figure) is stored in the program storage section 22.

The second storage section 22 stores interruption information Q1 which is to be edited by the processor 23. In the present embodiment, for instance, the interruption information Q1 is information for helping the user A to remember why the user A made a call (which may have been interrupted before a voice call actually began), and why the interruption occurred. Hereinafter, such a call will be referred to as an interrupted call. FIG. 3 is a schematic diagram illustrating an exemplary data structure of the interruption information Q1. In FIG. 3, the interruption information Q1 includes units R1, each of which is generated for every interrupted call. Each unit R1 is constructed so that a connection destination R11, a time of calling R12, a spent time R13, a location R14, ambient information R15, an interruption reason R16, and history information R17 can be registered thereto.

In the present embodiment, the connection destination R11 is information indicating a telephone number which has been used by the present mobile terminal apparatus 1 to place a call. The connection destination R11 is registered, for example, based on a telephone number which is input by means of the buttons 15.

The time of calling R12 indicates a point in time at which a call was placed by using the telephone number which is registered in the same unit R1. The time of calling R12 is registered based on a current time which is kept by the timer 29.

The spent time R13 is a period of time, from the time of calling R12 which is registered in the same unit R1 to a point when the call is interrupted. The spent time R13 is also registered based on a current time which is kept by the timer 29.

The location R14 indicates, by using a set of a longitude coordinate and a latitude coordinate, where the user A was located substantially at the time an interrupted call occurred. The location R14 is registered based on a longitude coordinate and a latitude coordinate which are acquired by the locating section 28.

In the case where the information of the location R14 is to be displayed to the user A, rather than displaying the values of a longitude coordinate and a latitude coordinate, information of a place which is derived therefrom may be displayed. For example, the name of such a place or a building, or an icon representing the same may be displayed. Alternatively, a map of the vicinity of the registered location R14 may be displayed together with a mark representing the location R14.

In the present embodiment, the ambient information R15 is still image information which was taken by the imaging section 16 at a place where the user A was located substantially at the time an interrupted call occurred. However, the ambient information R15 is not limited to still image information, but may also be audio information or moving picture information which was recorded in a place where the voice call was interrupted. In the case where audio information or moving picture information is used as the ambient information R15, the present mobile terminal apparatus 1 needs to have a microphone or a video camera. Furthermore, the ambient information R15 may be a combination of any two which are selected from the group consisting of a still image, audio, and moving pictures.

The interruption reason R16 is information which indicates the reason why a call was interrupted. In the present embodiment, for instance, three types of interruption reasons R16 that are distinguishable to the mobile terminal apparatus 1 are defined, since the mobile terminal apparatus 1 is to perform automatic registrations. A first interruption reason R16 is that the present mobile terminal apparatus 1 has moved out of the coverage area, i.e., that the mobile terminal apparatus 1 exists outside of a serviced area in which voice calls are enabled. A second interruption reason R16 is that the present mobile terminal apparatus 1 has run out of battery. A third interruption reason R16 is that the user A has operated the hang-up button 153 to intentionally interrupt the call. For conciseness of description, it is herein assumed that interruption IDs "10", "1", and "2" are assigned to the first, second, and third interruption reasons R16, respectively, and that a selected one of "0", "1", or "2" is to be registered as the interruption reason R16.

The history information R17, an example of which is resume information, is information that is necessary for displaying on the display 12 a result of executing, prior to making a call, an application program which was being executed by the present mobile terminal apparatus 1. Such history information 17 is typically retained in LIFO (Last In First Out) fashion. Preferably, the history information R17 further retains a subunit S1 corresponding to each application, as shown in FIG. 4. Each subunit S1 includes a program identifier V11, an activation method V12, and an activation condition V13. The program identifier V11 is information for identifying an application which was being executed by the present mobile terminal apparatus 1 prior to a call. In the present embodiment, the mailer P2, the browser P3, and the game program P4 are exemplified as applications. Therefore, as the program identifiers V11, it is herein assumed that "0", "1", and "2" are assigned to the mailer P2, the browser P3, and the game program P4, respectively, and that any one of these values is to be registered as the program identifier V11.

The activation method V12 is information indicating how an application which is identified in the same subunit S1 is to be activated. Specifically, the two following exemplary methods exist for the activation method V12. A first activation method is to activate the application "anew", i.e., from the beginning. A second activation method is to resume an application from a state which existed at the time an interruption occurred. For conciseness of description, it is herein assumed that activation method IDs "0" and "1" are assigned to the first and second activation methods, respectively, and that one of these activation method IDs is to be registered as the activation method V12.

The activation condition V13 is information indicating whether an application which is identified in the same subunit S1 is to be activated without requiring confirmation by the user A. For conciseness of description, it is assumed herein that an activation condition ID "0" is assigned to a condition that such an application is to be activated without requiring confirmation by the user A, and that an activation condition ID "1" is assigned to a condition that such an application is to be activated upon confirmation by the user A. As the activation condition V13, either one of such activation condition IDs is to be registered.

Note that the activation method V12 and the activation condition V13 may be previously set. Further alternatively, the user A may set the activation method V12 and/or the activation condition V13 according to his or her own preference, with an arbitrary timing.

Referring back to FIG. 2, the processor 23 executes one of the programs P1 to P4 while using the working area 24.

The wireless communication section 25 transfers an audio signal or data signal which has been received by the antenna 11 to the working area 24. The wireless communication section 25 outputs the audio signal or data signal which has been transferred from the working area 24 to the antenna 11.

The peripheral circuit 26 subjects an audio signal which has been transferred from the working area 24 to predetermined processing, and thereafter outputs an analog audio signal to the loudspeaker 13. Typical processes to be performed by the peripheral circuit 26 include decoding of an encoded audio signal, conversion of the decoded audio signal to an analog format, and amplification of the analog audio signal.

The peripheral circuit 27 subjects an execution result of each application, which is transferred from the working area 24, to predetermined processing, and thereafter outputs the processed execution result to the display 12. Typical processes to be performed by the peripheral circuit 27 include scaling for an image to be displayed and/or brightness adjustment.

The locating section 28 derives the current location of the present mobile terminal apparatus 1 by radio-aids-to-navigation and/or autonomous navigation. A typical example of the locating section 28 as such is a GPS (Global Positioning System) receiver. A GPS receiver derives the current location of the present mobile terminal apparatus 1 based on information which is sent from artificial satellites composing the GPS. The current location is represented by using at least a latitude coordinate and a longitude coordinate. Alternatively, the locating section 28 may derive the current location based on information which is sent from a PHS (Personal Handy-phone System) base station, for example. Although the present embodiment illustrates the locating section 28 as being internalized in the present mobile terminal apparatus 1, the present invention is not limited thereto. The locating section 28 may be a module which is detachable from the present mobile terminal apparatus 1.

The timer 29 keeps the current time.

Figure 5:
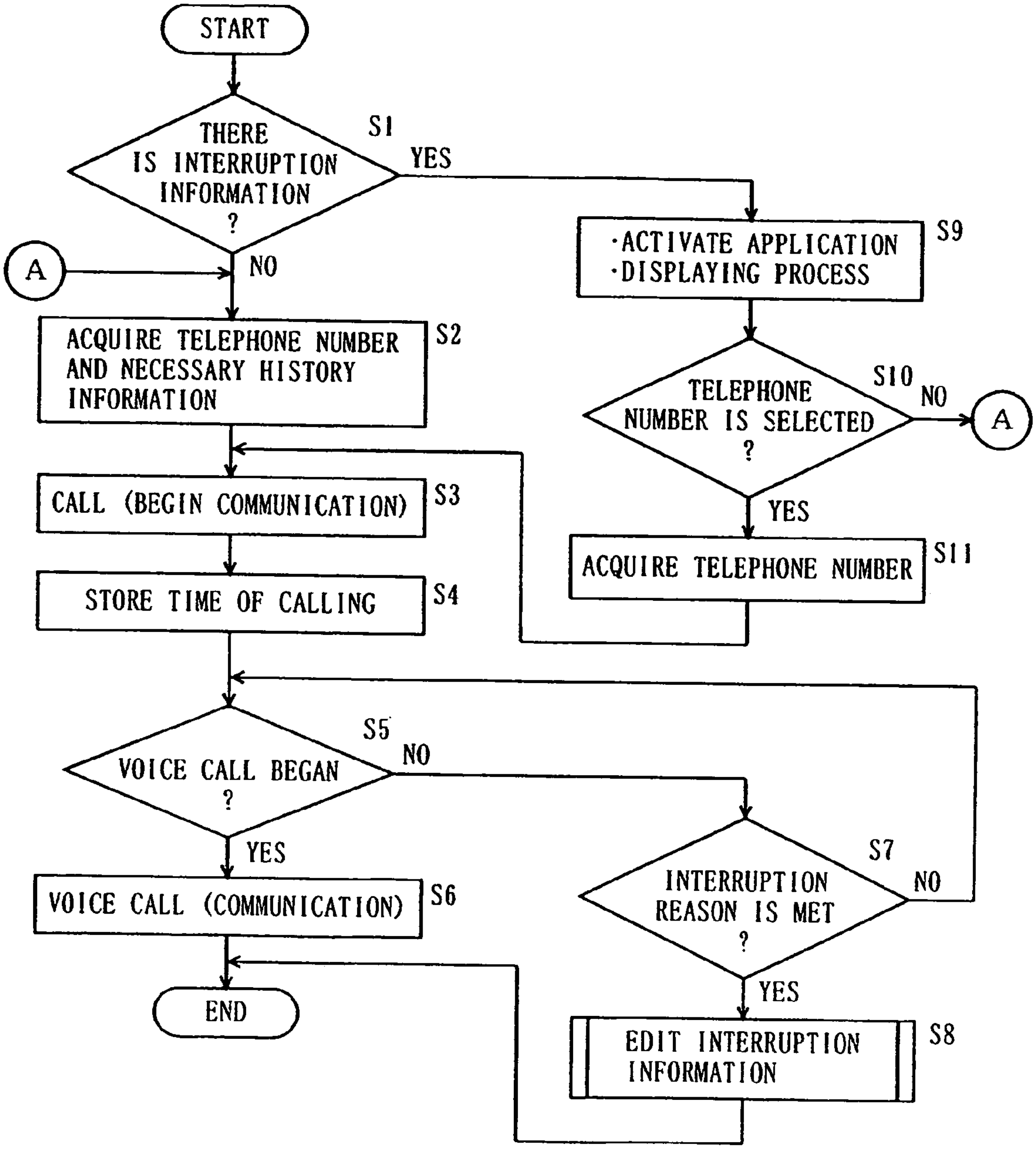
FIG. 5 is a flowchart illustrating an exemplary procedure of processing by a mobile terminal apparatus 1 shown in FIG. 1 and FIG. 2.

Next, with reference to the flowchart of FIG. 5, the processes performed by the mobile terminal apparatus 1 having the above structure will be described. As a preliminary process before placing a call, the processor 23 first determines whether there exists interruption information Q1 or not (FIG. 5; step S1). In the following description, it is conveniently assumed that no unit R1 exists at this point.

Under the above assumption, in order to place a call, the user will specify a telephone number without referring to interruption information Q1. The processor 23 acquires the telephone number specified by the user, and further acquires history information R17 as necessary (step S2).

There exist several example methods for acquiring a telephone number, such as follows. Firstly, after operating the start button 152, the user A may directly input a telephone number by operating some of the buttons 151 as necessary, or designate one of a list of telephone numbers which have been called in the past. The processor 23 acquires the telephone number which has been thus designated.

Secondly, the user A may operate the mobile terminal apparatus 1 to activate the mailer P2. Thereafter, the processor 23 executes the mailer P2 in accordance with the user A's operation of the buttons 15. While the mailer P2 is being executed, the processor 23 generates an e-mail whose body text contains a telephone number, and transfers it to the peripheral circuit 26. As illustrated in FIG. 6, the display 12 displays the body text of the e-mail which has been sent from the peripheral circuit 26, whereby the body text of thee-mail, containing the telephone number N, is displayed on the display 12. In this state, the user A operates the buttons 15 to designate the currently displayed telephone number N. The processor 23 acquires the telephone number N which has been thus designated. Moreover, the processor 23 stores to the working area 24 the execution result of the mailer P2, i.e., the body text of the e-mail containing the telephone number N, as history information R17 which may be used later. In conjunction with the history information R17, the processor 23 also generates a subunit V1 for the mailer P2, and stores it to the working area 24.

Figure 7:
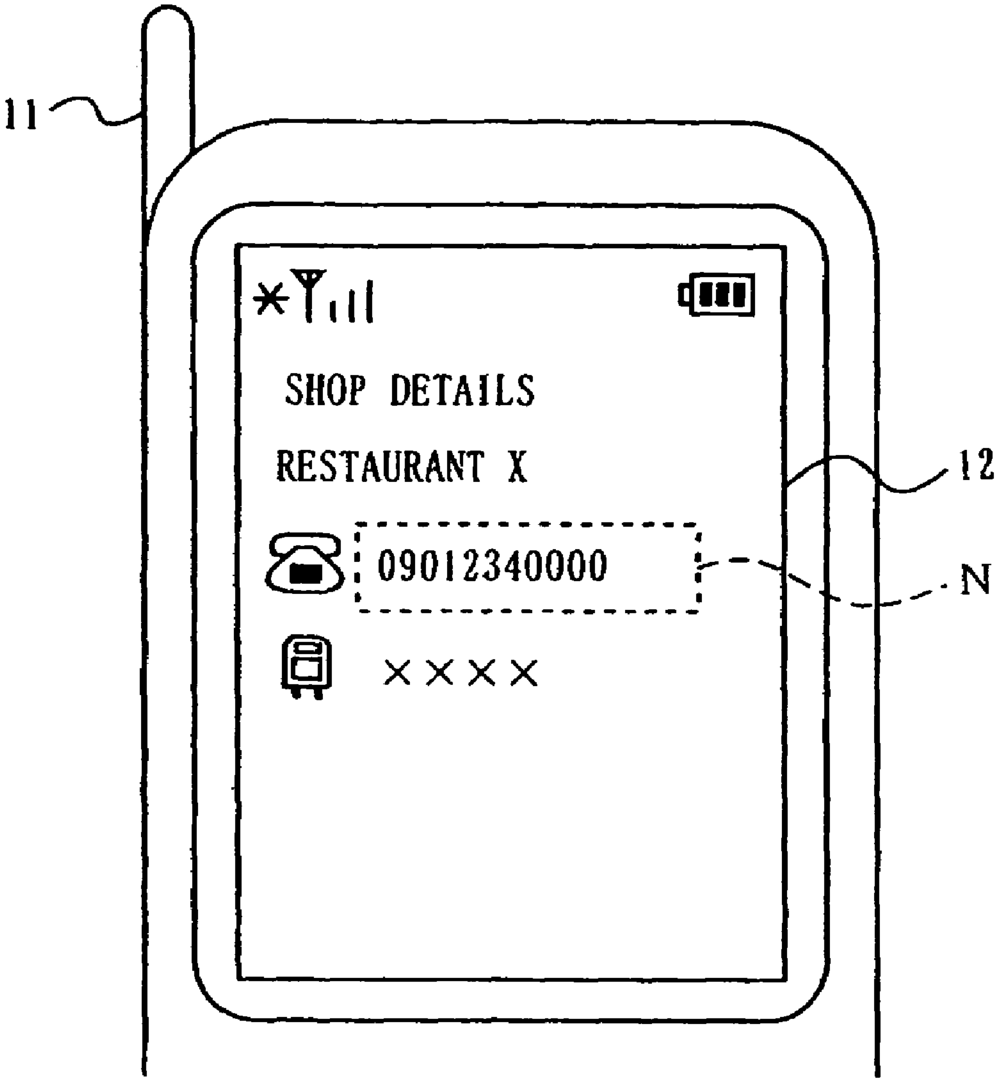
FIG. 7 is a schematic diagram illustrating an exemplary displayed image of a result of executing a browser P3 shown in FIG. 2.

Thirdly, the user A may operate the mobile terminal apparatus 1 to activate the browser P3. Thereafter, the processor 23 executes the browser P3 in accordance with the user A's operation. While the browser P3 is being executed, the processor 23 generates an execution result representing a media content containing a telephone number N, and transfers it to the peripheral circuit 26. As illustrated in FIG. 7, the display 12 displays the execution result which has been sent from the peripheral circuit 26, whereby the media content containing the telephone number N is displayed on the display 12. In this state, the user A operates the buttons 15 to designate the currently displayed telephone number N. The processor 23 acquires the telephone number N which has been thus designated. Moreover, the processor 23 stores to the working area 24 the execution result of the browser P3, i.e., the media content containing the telephone number N, as history information R17 which may be used later. In conjunction with the history information R17, the processor 23 also generates a subunit V1 for the browser P3, and stores it to the working area 24.

Note that it is also possible for the processor 23 to acquire a telephone number by using interruption information Q1, as will be described later.

Next to step S2, in accordance with the voice calling program P1, the processor 23 performs a communication process for beginning a communication with a communications device specified by the telephone number (step S3), using the currently acquired telephone number. Specifically, at step S3, the processor 23 places a call in order to perform a voice communication with a counterparting communications device (e.g., a cellular phone).

Thereafter, the processor 23 stores the currently-used telephone number as the connection destination R11, and the current time obtained from the timer 29 as the time of calling R12, to the working area 24 (step S4).

Next, the processor 23 determines whether a voice call with the other end of the call has begun or not (step S5). If it is determined YES, the respective elements of the mobile terminal apparatus 1 perform processes which are necessary for the voice call (step S6). Once the voice call is over, the respective elements of the mobile terminal apparatus 1 end their processes.

On the other hand, if step S5 determines NO, the processor 23 determines whether any one of the aforementioned first to third interruption reasons has been met (step S7). Specifically, the processor 23 checks the remaining power of a battery (not shown) of the present mobile terminal apparatus 1, and if the remaining power is substantially zero, step S7 determines YES. Moreover, the processor 23 checks whether the user A has operated the hang-up button 153. If the hang-up button 153 has been operated, step S7 determines YES. Furthermore, the processor 23 checks the intensity of field received by the antenna 11, and if the intensity of the received field is below a reference value, determines that the present mobile terminal apparatus 1 has moved out of the coverage area, and step S7 determines YES.

If step S7 determines NO, the processor 23 performs step S5. On the other hand, if step S7 determines YES, the processor 23 performs an editing process for the interruption information Q1 (step S8). Hereinafter, with reference to the flowchart of FIG. 8, the process of step S4 will be described in detail.

Figure 8:
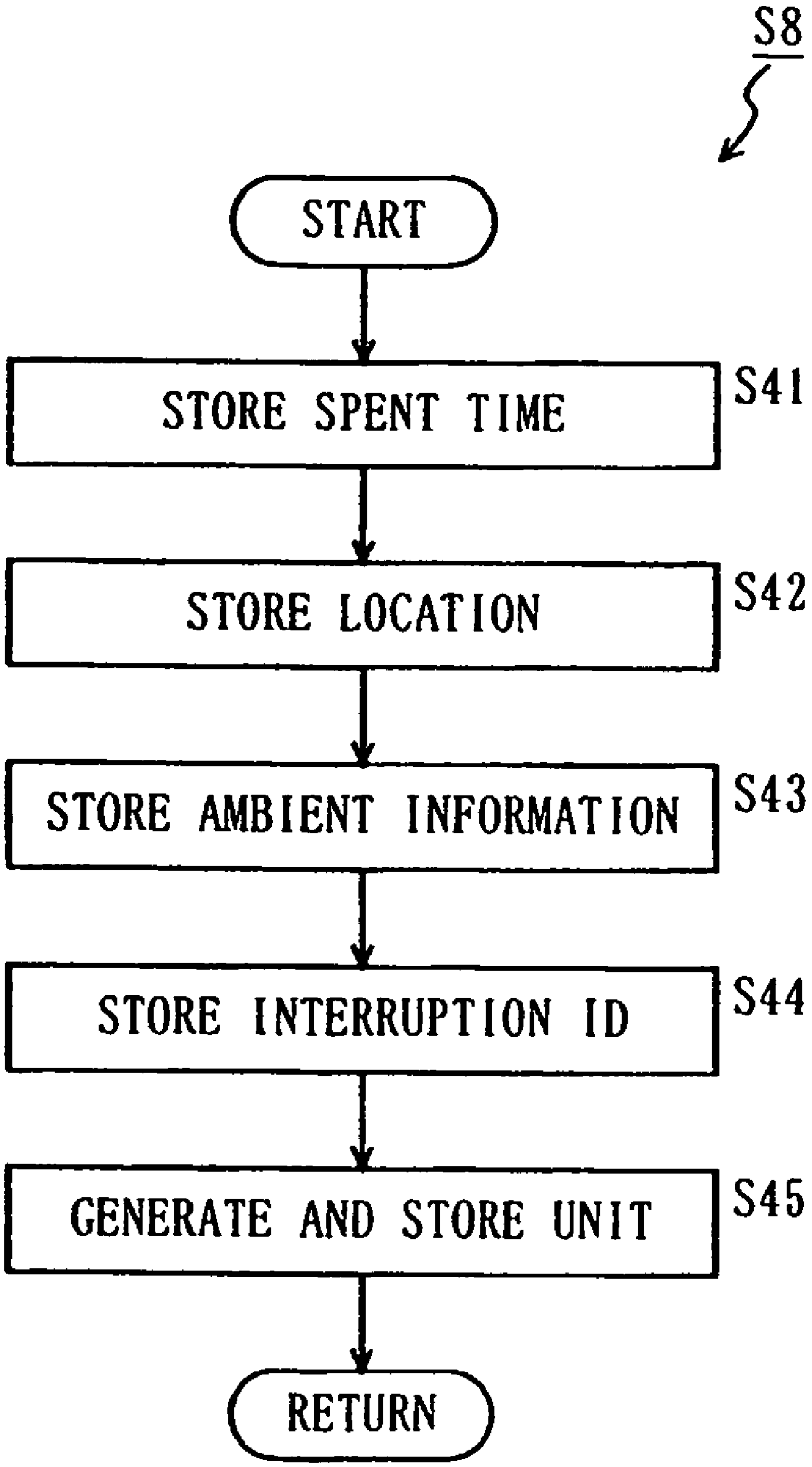
FIG. 8 is a flowchart illustrating an exemplary detailed procedure of processing of step S8 in FIG. 5.

In FIG. 8, first, the processor 23 derives a difference between the current time obtained from the timer 29 and the time of calling R12 which was stored at step S4, and stores this difference as a spent time R13 to the working area 24 (step S41).

Next, the processor 23 stores a set of a longitude coordinate and a latitude coordinate obtained from the locating section 28 to the working area 24 as location information R14 (step S42).

Next, the processor 23 stores the still image information obtained from the imaging section 16 to the working area 24 as ambient information R15 (step S43).

Next, the processor 23 stores an interruption ID representing the interruption reason identified at step S7 to the working area 24 (step S44).

Next, the processor 23 generates a unit R1 by arranging in order the connection destination R11, the time of calling R12, the spent time R13, the location R14, the ambient information R15, the interruption reason R16, and the history information R17 which are currently stored in the working area 24, and stores the unit R1 to the second storage section 22 as part of the interruption information Q1 (step S45).

After step S45 as above is over, the processor 23 ends step S8 shown in FIG. 5.

If the user A wishes to make a voice call in the state where the thus-generated interruption information Q1 is present in the second storage section 22, the processor 23 determines at step S1 in FIG. 5 that interruption information Q1 exists. In this case, the processor 23 performs a displaying process based on the interruption information Q1 stored in the second storage section 22 (step S9).

Next, several examples of methods of displaying the interruption information Q1 will be described. As described above, the history information R17 may be, as an execution result of the mailer P2, the body text of an e-mail containing a telephone number N (see FIG. 6), or, as an execution result of the browser P3, a media content containing a telephone number N (see FIG. 7). Therefore, by displaying on the display 12 the body text of an e-mail or a media content as such, the user A is given a clue for refreshing his or her memory from the last time the user A made a phone call, such that the user can easily remember why the user placed the call to the telephone number N. To this end, the processor 23 performs a displaying process in accordance with the content of the subunit V1 included in the history information R17.

In the example shown in FIG. 4, an activation method ID "1" and an activation condition ID "0" are set for the mailer P2. Therefore, in accordance with the history information R17, the processor 23 immediately resumes the mailer P2, unconditionally, from a state which existed when the call was interrupted. Consequently, a body text of the e-mail as shown in FIG. 6 is displayed on the display 12. As for the browser P3, an activation method ID "1" and an activation condition ID "1" are set in the example shown in FIG. 4. Therefore, the processor 23 first generates a dialog for permitting the user A to instruct whether or not to accept activation of the browser P3, and causes the display 12 to display the dialog. If the user A permits activation of the browser P3, the processor 23 resumes the browser P3 from a state which existed when the call was interrupted, in accordance with the history information R17. Consequently, a media content as shown in FIG. 7 is displayed on the display 12.

As an auxiliary aid, the processor 23 may display on the display 12 at least one selected from the connection destination R11, the time of calling R12, the spent time R13, the location R14, the ambient information R15, and the interruption reason R16 which are contained in the unit R1. By displaying such an auxiliary aid, it becomes even easier for the user A to remember what was going on when the call was interrupted, and to remember why the user A called that telephone number N.

In some cases, the interruption information Q1 may contain a plurality of units R1. In such cases, the processor 23 performs processing with respect to these units R1 in accordance with a predetermined order of priority among them. For example, the processor 23 may perform the aforementioned displaying process by selecting a unit R1 on a new-ones-first basis or old-ones-first basis with respect to the time of calling R12.

Alternatively, the processor 23 may perform the aforementioned displaying process by selecting a unit R1 based on the spent time R13, such that those having greater values of spent time R13 are processed first. Performing a selection based on this order has the following advantage. If the spent time R13 has a great value, it is implied that the user A was really desiring to make the voice call, and really wanting to talk to the other end of the call. Therefore, adopting such a selection method for the units R1 makes it possible to provide a more user-friendly mobile terminal apparatus 1.

After step S9 above, the processor 23 determines whether the user A has selected the currently displayed telephone number (step S10). If it is determined YES, the processor 23 obtains the selected telephone number (step S11), and thereafter performs step S3. On the other hand, if it is determined NO, the processor 23 performs step S2.

As described above, if a call is interrupted, the mobile terminal apparatus 1 according to the present embodiment generates and retains interruption information Q1 which can represent a variety of situations that may exist at the time of the interruption, in preparation of a possible re-calling. When the user A later attempts a re-calling, the mobile terminal apparatus 1 displays such interruption information Q1. Thus, it is made easier for the user A to remember why he or she made the call which was eventually interrupted, and why the interruption occurred.

Furthermore, it is usually the case that, after activating the mailer P2 or the browser P3, the user needs to operate the buttons 15 a number of times until reaching the desired e-mail or media content. Therefore, if the user A tries to remember the interruption reason by using the mailer P2 or the browser P3 without the interruption information Q1, the user A will need to operate the buttons 15 a number of times. However, on the basis of the unique interruption information 1l, and in particular the history information R17, the present mobile terminal apparatus 1 is able to resume the mailer P2 or the browser P3 from a state which existed when the call was interrupted. As a result, the number of times of operating the buttons 15 is drastically reduced. Thus, a more user-friendly mobile terminal apparatus 1 can be provided.

Since the second storage section 22 has limitations in terms of storage capacity, the units R1 must be deleted as necessary. If a call is received from a user of a telephone number which is recorded in the connection destination R11, resulting in a voice call, then the processor 23 recognizes a successful instance of a voice call and erases a unit R1 containing that connection destination R11 from the second storage section 22. Otherwise, if a telephone number which is recorded in the connection destination R11 is called, resulting in a voice call, then the processor 23 erases a unit R1 containing that connection destination R11 from the second storage section 22. Otherwise, if a predetermined amount of time has lapsed since the time of calling R12, the processor 23 may erase a unit R1 containing that time of calling R12 from the second storage section 22.

The above embodiment illustrates an example where the mobile terminal apparatus 1 performs processes concerning a voice call, although not limited thereto. The present embodiment is also applicable to a mobile terminal apparatus 1 capable of accessing the Internet. In this case, as the connection destination R11 in the interruption information Q1, information indicating where an information resource exists on the network (i.e., a counterparting communications device), such as a URL (Uniform Resource Locator) or a URI (Uniform Resource Identifier), is registered, instead of a telephone number. As a result, if the user connects to a given information resource and thereafter the connection is interrupted for some reason, the user can easily remember why he or she connected to that information resource and why the interruption occurred later on.

The above embodiment illustrates an example where the mobile terminal apparatus 1 generates the interruption information Q1 from an execution result of the mailer P2 or the browser P3. However, the mobile terminal apparatus 1 can generate the interruption information Q1 also from an execution result of the game program P4. Specifically, the user A may be enjoying a game which is realized by the game program P4 being executed by the mobile terminal apparatus 1, and desire to let his or her friend know about the progress of the game or a high score. If no interruption information Q1 exists in such a situation, the user specifies a telephone number. At step S2 shown in FIG. 5, the processor 23 acquires the telephone number specified by the user, and further acquires the history information R17 of the game program P4. Thereafter, as a result of executing steps S3 to S8, a unit R1 containing the aforementioned history information R17 may be generated in the second storage section 22.

In order to perform a re-calling by using a unit R1 which has been generated in the above manner, the processor 23 first causes the display 12 to display the unit R1 at step S9. Since an activation method ID "0" and an activation condition ID "1" are set for the game program P4 in the example shown in FIG. 4, the processor 23 immediately activates the game program P4 unconditionally, and causes the display 12 to display an opening screen thereof. Depending on the combination of the activation method ID and the activation condition ID, the aforementioned dialog may be displayed, or an application in accordance with the history information R17 may be displayed on the display 12.

In the description of the above embodiment, it is assumed that the present mobile terminal apparatus 1 is a cellular phone, although not limited thereto. The above embodiment is also applicable to digital equipment such as PDAs (Personal Digital Assistants) with a telephone function, digital cameras with a telephone function, or car navigation systems with a telephone function. Otherwise, the present mobile terminal apparatus 1 is also applicable to digital equipment capable of accessing the Internet.

In the description of the above embodiment, it is assumed that the voice calling program P1 is stored in an internal memory in the mobile terminal apparatus 1 (i.e., the first storage section 21), although not limited thereto. The voice calling program P1 may be distributed in a recorded form on a distribution medium such as a CD-ROM, or may be distributed through a network such as the Internet.

(Other Exemplary Structures)

In the description of the above embodiment, it is assumed that the unique function of the present mobile terminal apparatus 1 is realized by the processor 23 executing the voice calling program P1, although not limited thereto. The function realized by the aforementioned voice calling program P1 may typical be realized as an LSI (Large Scale Integrated circuit), which is a type of integrated circuit.

Figure 9:
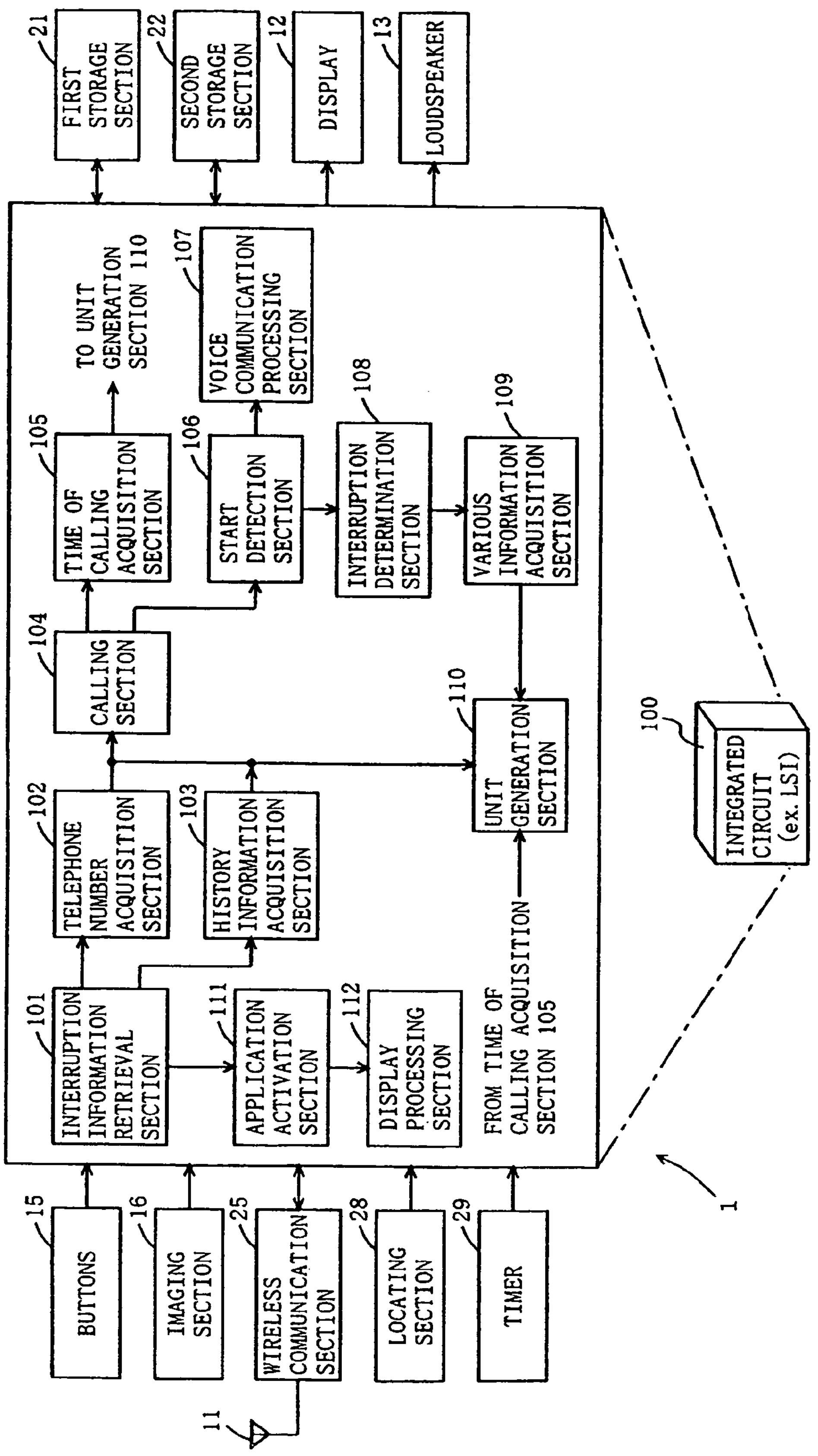
FIG. 9 is a functional block diagram illustrating another exemplary structure of the mobile terminal apparatus 1 according to the first embodiment.

FIG. 9 is a functional block diagram illustrating another exemplary structure of the mobile terminal apparatus 1. In FIG. 9, the mobile terminal apparatus 1 differs from that shown in FIG. 2 in that the function realized by the voice calling program P1 is realized by means of an integrated circuit 100. Since there are no other differences between them, those elements in FIG. 9 which have corresponding counterparts in FIG. 2 are denoted by the same reference numerals as those used therein, and the descriptions thereof are omitted.

The integrated circuit 100 shown in FIG. 9 comprises an interruption information retrieval section 101, a telephone number acquisition section 102, a history information acquisition section 103, a calling section 104, a time of calling acquisition section 105, a start detection section 106, a voice communication processing section 107, an interruption determination section 108, a various information acquisition section 109, a unit generation section 110, an application activation section 111, and a display processing section 112.

The interruption information retrieval section 101 determines whether there is interruption information Q1 in the second storage section 22.

If there is no interruption information Q1, the history information acquisition section 103 acquires the aforementioned history information R17, and passes the history information R17 to the unit generation section 110. If there is no interruption information Q1, the telephone number acquisition section 102 acquires a telephone number which is designated by the user, and passes the telephone number to the calling section 104 and the unit generation section 110.

Using the currently received telephone number, the calling section 104 performs a communication process for beginning a communication with a communications device specified by the telephone number.

If the calling section 104 places a call, the time of calling acquisition section 105 acquires the current time obtained from the timer 29 as a time of calling R12, and passes it to the unit generation section 110.

If a voice call with the other end of the call begins the start detection section 106 notifies so to the voice communication processing section 107 and the interruption determination section 108.

When a detection result by the start detection section 106 is received, the voice communication processing section 107 performs a process which is necessary for a voice call, and when the voice call is over, ends this process.

If the interruption determination section 108 determines whether any one of the aforementioned first to third interruption reasons has been met, the interruption determination section 108 notifies so to the various information acquisition section 109.

The various information acquisition section 109 acquires a spent time R13, location information R14, ambient information R15, and an interruption reason R16 similar to those described above, and passes them to the unit generation section 110.

The unit generation section 110 generates a unit R1 from a connection destination R11 (which is the telephone number received from the telephone number acquisition section 102), the time of calling R12, the spent time R13, the location R14, the ambient information R15, the interruption reason R16, and the history information R17, and passes the unit R1 to the second storage section 22. The second storage section 22 stores the unit R1 generated by the unit generation section 110 as part of the interruption information Q1.

When the user A attempts to make a voice call, if there exists interruption information Q1, the interruption information retrieval section 101 notifies so to the application activation section 111.

The application activation section 111 activates an application in a manner similar to that described above.

The display processing section 112 performs a process for displaying on the display 12 a result of executing the application which has been activated by the application activation section 111.

The technological effects described in the first embodiment can also be obtained by using the other structure as described above.

In the above description, it is assumed that a single integrated circuit 100 implements the main function of the voice calling program P1, although not limited thereto. One integrated circuit may be constructed from selected ones of the elements and functions composing the mobile terminal apparatus 1, as appropriate.

An LSI is illustrated as a typical example of the integrated circuit 100 in the above description, although not limited thereto. The integrated circuit 100 may be called an IC (Integrated Circuit), a system LSI, a super LSI, or an ultra LSI, depending on the degree of integration.

The circuit integration technique is not limited to LSIs. The integrated circuit 100 may be implemented as a specially-designed circuit or a generic processor. Furthermore, the integrated circuit 100 may be implemented by using an FPGA (Field Programmable Gate Array) which is capable of being programmed after the LSI is produced, or a reconfigurable processor (the interconnections and settings of circuit cells within the LSI can be reconfigured).

It will also be appreciated that, if advancements in semiconductor technology or any other technique branching off from semiconductor technology produces a circuit integration technique that replaces LSIs, the respective elements and functions may be integrated by using such a technique. Needless to say, biotechnology, for example, is also applicable to integration.

SECOND EMBODIMENT

Figure 11:
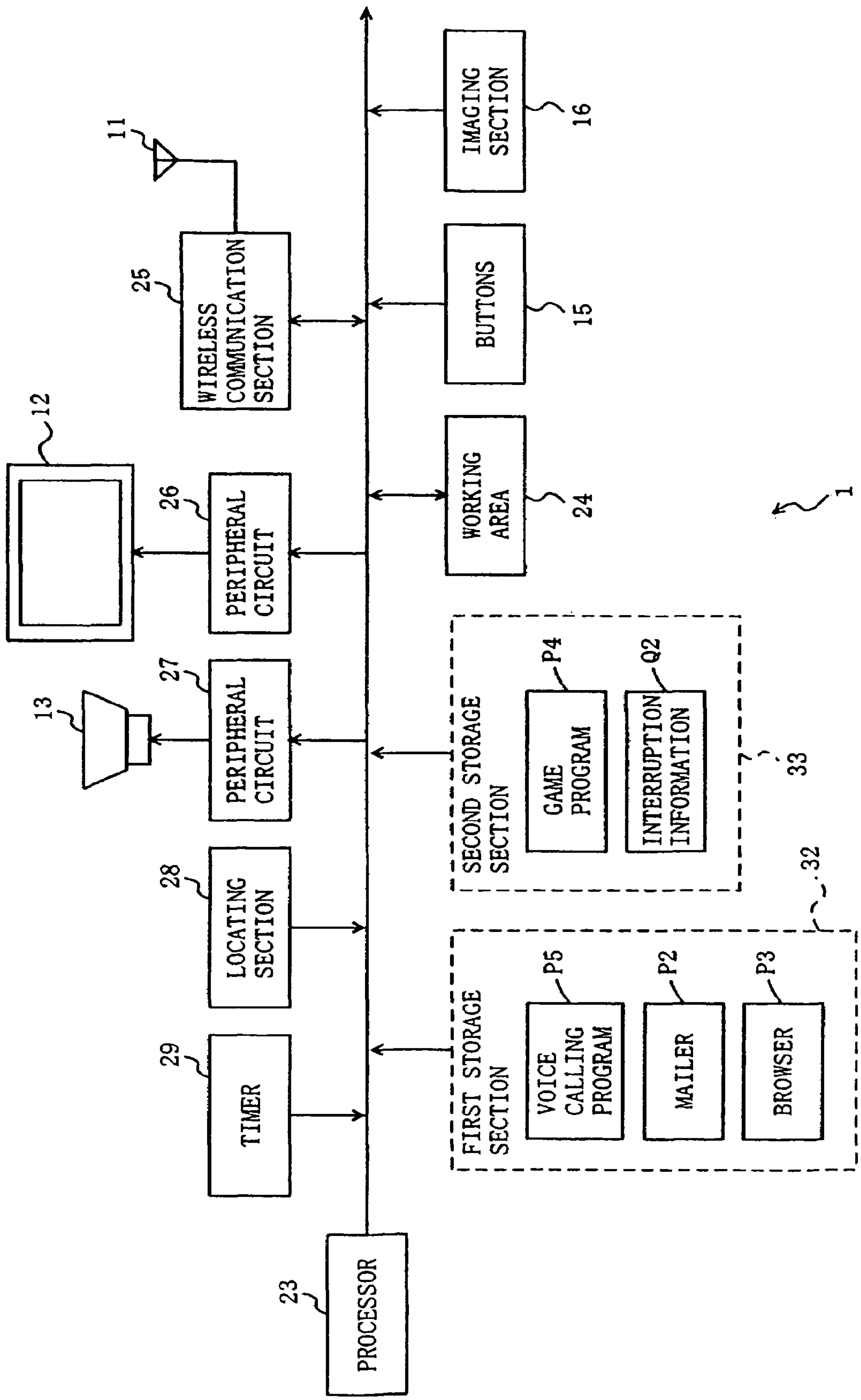
FIG. 11 is a block diagram showing a hardware configuration of the mobile terminal apparatus 3 shown in FIG. 10.

FIG. 10 is a schematic diagram illustrating an exemplary outer structure of a mobile terminal apparatus 3 according to a second embodiment of the present invention. FIG. 11 is a block diagram showing a hardware configuration of the mobile terminal apparatus 3 shown in FIG. 10. In FIG. 10 and FIG. 11, the mobile terminal apparatus 3 differs from the mobile terminal apparatus 1 shown in FIG. 1 in that buttons 31 are comprised instead of the buttons 15; a first storage section 32 is comprised instead of the first storage section 21; and a second storage section 33 is comprised instead of the second storage section 22. Otherwise, there are no differences in outer structure between the mobile terminal apparatus 3 and 1. Therefore, in FIG. 10 and FIG. 11, those elements which have corresponding counterparts in FIG. 1 are denoted by the same reference numerals as those used therein, and the descriptions thereof are omitted.

The buttons 31 include a number of buttons to be operated by the hands of the user A. These buttons at least include a suspend button 311, in addition to several buttons 151, a start button 152 and a hang-up button 153, which have been described in the first embodiment.

The suspend button 311 is a button to be operated by the user A in order to interrupt a voice call which was once begun, before the voice call is completed. Such a suspend button 311 is operated in a situation below. As is well known, there are places in a serviced area where it is not considered favorable to make a voice call from the standpoint of public manners or etiquette (e.g., within a train). When a train approaches a train platform, the user A will operate the suspend button 311 before the voice call is completed. Although a typical example of operating the suspend button 311 is illustrated, the suspend button 311 may be operated not only in the above-described situation but in any other various'situation.

The first storage section 32 differs from the aforementioned first storage section 21 in that the first storage section 32 stores a voice calling program P5, instead of the voice calling program P1. The voice calling program P5 is an application which describes a voice call process that is specific to the present embodiment.

The second storage section 33 differs from the aforementioned second storage section 22 in that it stores interruption information Q2 which is edited by the processor 23. In the present embodiment, for instance, the interruption information Q2 is information for helping the user A to remember why a voice call which was once begun has been interrupted. FIG. 12 is a schematic diagram illustrating an exemplary data structure of the interruption information Q2. In FIG. 12, the interruption information Q2 includes units R2, each of which is generated for every interrupted voice call. Each unit R2 differs from the aforementioned unit R1 in that each unit R2 is constructed so that a spent time R21 can be registered instead of the spent time R13, and that an interruption reason R22 can be registered instead of the interruption reason R16. Otherwise, there are no differences between units R2 and R1. Therefore, in FIG. 12, any units of information corresponding to those shown in FIG. 3 are denoted by the same reference numerals as those used therein, and the descriptions thereof are omitted.

Generically, the spent time R21 is a period of time from a time of calling R12 which is registered in the same unit R2 to when the voice call is interrupted. In the present embodiment, as a specific example, the spent time R21 is substantially equal to a period of time from the time of calling R12 to when the suspend button 311 is operated. The spent time R21 is to be registered based on a current time as kept by the timer 29.

The interruption reason R22 is information representing a reason why the voice call has been interrupted. From the same standpoint as in the first embodiment, three types of interruption reasons R22 that are distinguishable to the mobile terminal apparatus 3 are defined, for instance. The first and second interruption reasons R22 are identical to those in the first embodiment, and therefore the descriptions thereof are omitted. However, a third interruption reason R22 is that the user A has operated the suspend button 311 to intentionally interrupt the voice call. For conciseness of description, it is assumed that interruption IDs "0", "1", and "2" are assigned to the first, second, and third interruption reasons R22, respectively, and that a selected one of "0", "1", or "2" is to be registered as the interruption reason R22.

Figure 13:
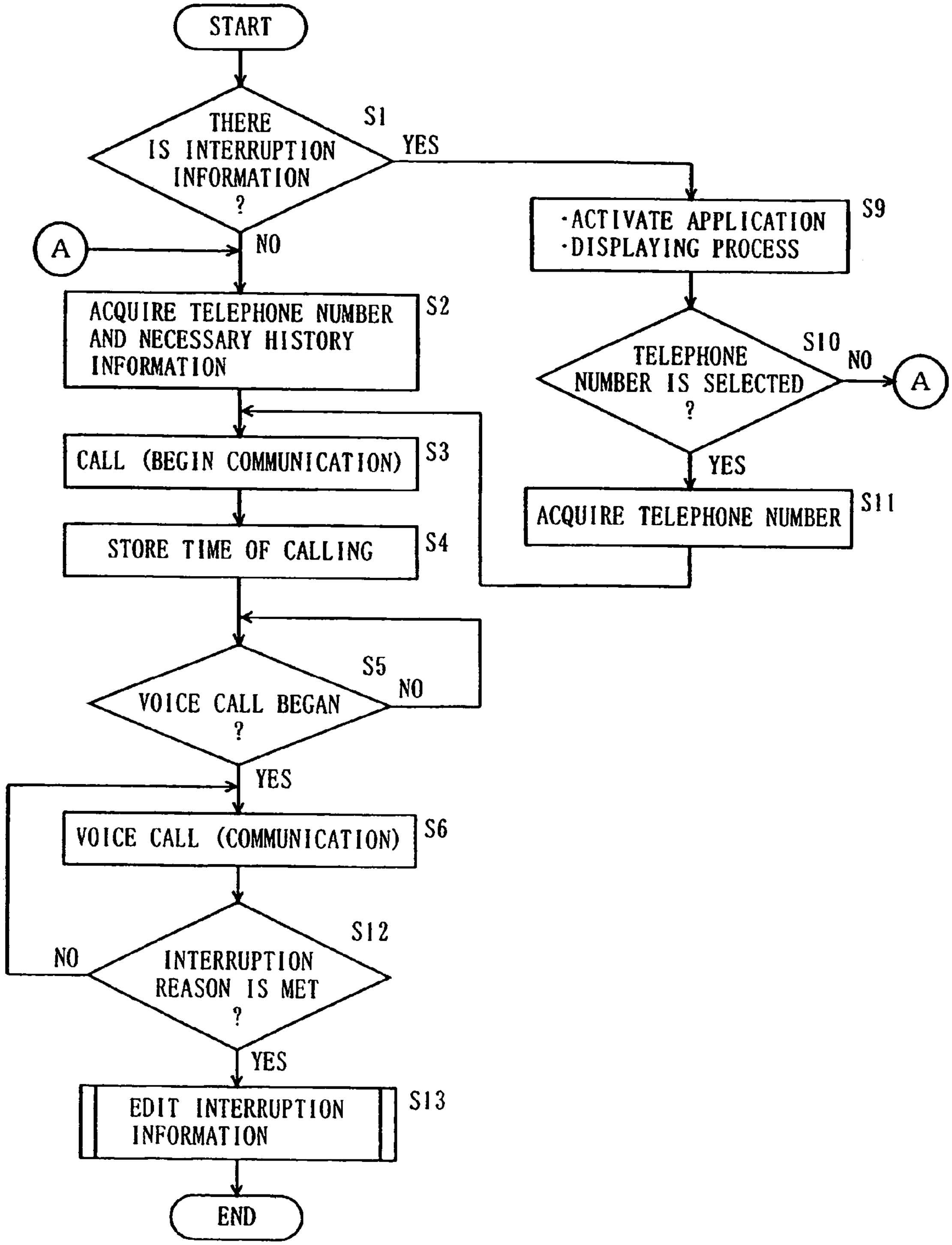
FIG. 13 is a flowchart illustrating an exemplary procedure of processing by the mobile terminal apparatus 3 shown in FIG. 10 and FIG. 11.

Next, with reference to the flowchart of FIG. 13, the processes performed by the mobile terminal apparatus 3 having the above structure will be described. FIG. 13 differs from FIG. 5 in that steps S12 and S13 are comprised instead of steps S7 and S8. Otherwise, there are no differences between these flowcharts. Therefore, in FIG. 13, any steps corresponding to those shown in FIG. 5 are denoted by the same reference numerals as those used therein, and the descriptions thereof are omitted.

After step S6, the processor 23 determines whether any one of the aforementioned first to third interruption reasons has been met (step S12). As in the first embodiment, the processor 23 determines YES at step S12 if the remaining power of a battery (not shown) of the present mobile terminal apparatus 1 or the intensity of field received by the antenna 11 is equal to or less than a reference value. Furthermore, the processor 23 checks whether the user A has operated the suspend button 311. If the suspend button 311 has been operated, step S12 determines YES.

Figure 14:
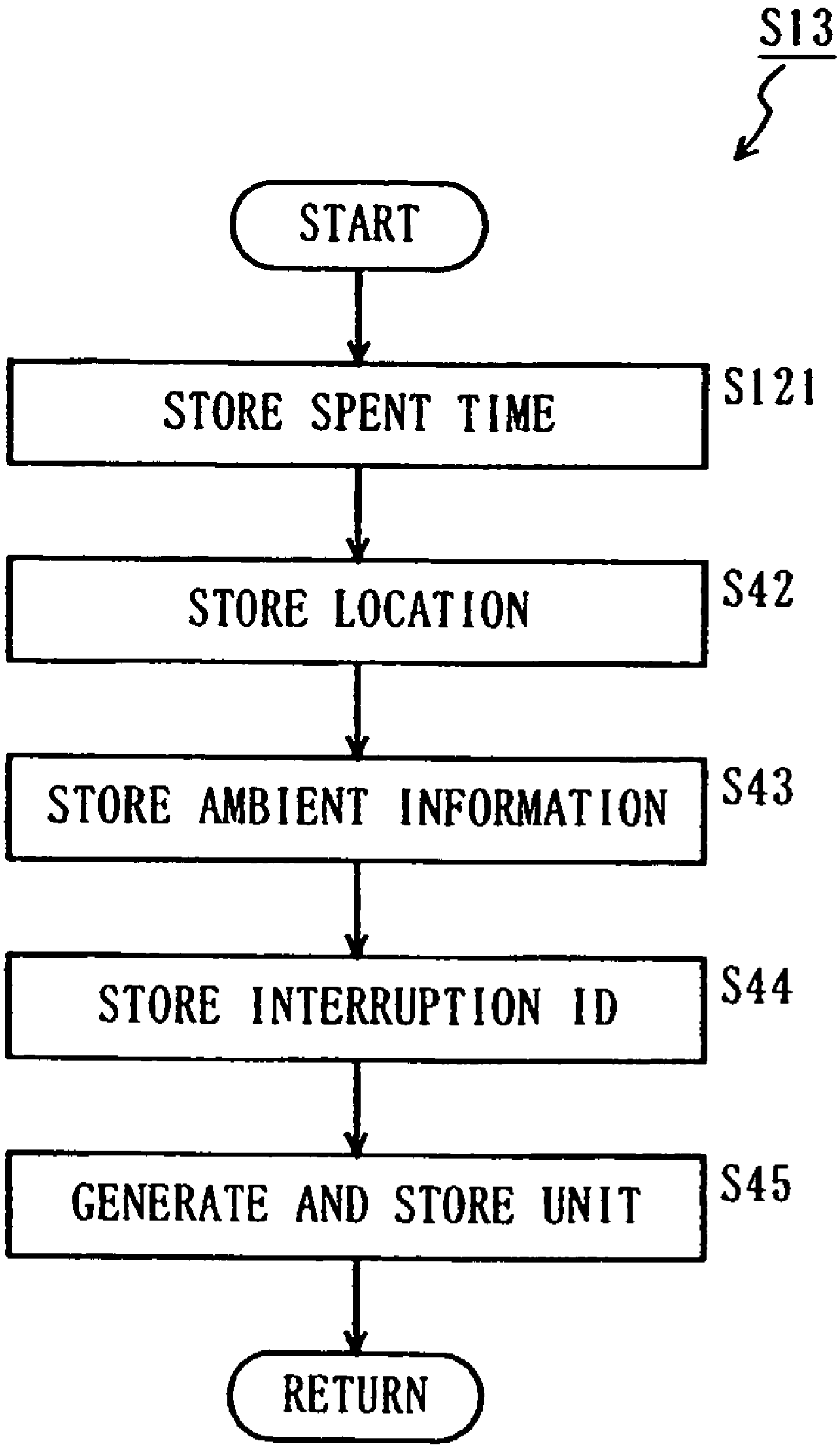
FIG. 14 is a flowchart illustrating an exemplary detailed procedure of processing of step S13 in FIG. 13.

If the above step S12 determines NO, the processor 23 performs step S6 to continue to perform a voice communication. On the other hand, if step S12 determines YES, the processor 23 performs an editing process for the interruption information Q2 (step S13). Hereinafter, with reference to the flowchart of FIG. 14, the process of step S13 will be described in detail. FIG. 14 differs from FIG. 8 in that step S41 is replaced by step S121. Otherwise, there are no differences between these flowcharts. Therefore, in FIG. 14, any steps corresponding to those shown in FIG. 8 are denoted by the same reference numerals as those used therein, and the descriptions thereof are omitted.

In FIG. 14, the processor 23 first derives a difference between the current time obtained from the timer 29 and a time of calling R12 stored in step S3, and stores this difference to the working area 24 as a spent time R21 (step S121).

Thereafter, the processor 23 performs steps S42 to S45 to generate the interruption information Q2, and stores it to the second storage section 33. Upon completing step S45, the processor 23 ends step S13 shown in FIG. 13.

If the user A wishes to make a voice call in the state where the thus-generated interruption information Q2 is present in the second storage section 33, the processor 23 determines at step S1 in FIG. 13 that interruption information Q2 exists. In this case, the processor 23 performs a displaying process based on the interruption information Q2 stored in the second storage section 33, as in the manner of the first embodiment (step S9).

As described above, if a voice call which was once begun is interrupted, the mobile terminal apparatus 3 according to the present embodiment generates and retains interruption information Q2 which can represent a variety of situations that may exist at the time of the interruption of the voice call, in preparation of a possible re-calling. When the user A later attempts a re-calling, the mobile terminal apparatus 3 displays such interruption information Q2. Thus, it is made easier for the user A to remember why the voice call was interrupted.

Furthermore, as described in the first embodiment, on the basis of the unique interruption information Q2, and in particular the history information R17, the present mobile terminal apparatus 3 is able to resume the mailer P2 or the browser P3 from a state which existed when the voice call was interrupted. As a result, the number of times of operating the buttons 31 is drastically reduced. Thus, a more user-friendly mobile terminal apparatus 3 can be provided.

As described in the first embodiment, the units R2 must be deleted as necessary since the second storage section 33 has limitations in terms of storage capacity.

As described in the first embodiment, the second embodiment is also applicable to a mobile terminal apparatus 3 capable of accessing the Internet.

As in the first embodiment, it is possible in the second embodiment to generate the interruption information Q2 in a situation where the game program P4 is being executed.

As in the first embodiment, the present mobile terminal apparatus 3 is also applicable to digital equipment such as PDAs (Personal Digital Assistants) with a telephone function, digital cameras with a telephone function, or car navigation systems with a telephone function. Otherwise, the present mobile terminal apparatus 3 is also applicable to digital equipment capable of accessing the Internet.

In the description of the above embodiment, it is assumed that the voice calling program P5 is stored in an internal memory in the mobile terminal apparatus 3 (i.e., the first storage section 32), although not limited thereto. The voice calling program P5 may be distributed in a recorded form on a distribution medium such as a CD-ROM, or may be distributed through a network such as the Internet.

In the above embodiment, the voice calling program P5 may be distributed in a recorded form on a distribution medium, or may be distributed through a network, as is the case with the voice calling program P1.

As described in the first embodiment, those functions realized by the voice calling program P5 and elements of the mobile terminal apparatus 5 which are appropriately selected may be implemented as an integrated circuit.

THIRD EMBODIMENT

Hereinafter, a mobile terminal apparatus according to a third embodiment of the present invention will be described. There are several manners of practicing the mobile terminal apparatus according to the present invention. First, a manner of using of the mobile terminal apparatus according to the present invention will be described.

The mobile terminal apparatus according to the present invention is typically a cellular phone 200 as shown in FIG. 15. The cellular phone 200 comprises an antenna 201 with which to perform communications, a screen 202 for displaying data, a loudspeaker 203 for outputting audio, buttons 204 with which to perform inputs, and other devices. The buttons 204 with which to perform inputs include an application suspend button 205 and an application resume button 206.

The user A executes an application on the cellular phone 200 to receive various services. Instructions to an application are given mainly by pressing the buttons 204. The user A may interrupt the execution of an application at any arbitrary point in time. The interruption of an application can be performed by pressing the application suspend button 205. Thereafter, the user A may resume the once-interrupted application at any arbitrary point in time. The resume of an application can be performed by pressing the application resume button 206.

Although the interruption and resume operations of an application in the above illustration are assigned to dedicated buttons 205 and 206, the interruption and resume operations may be assigned to any one of the input buttons 204.

Figure 16:
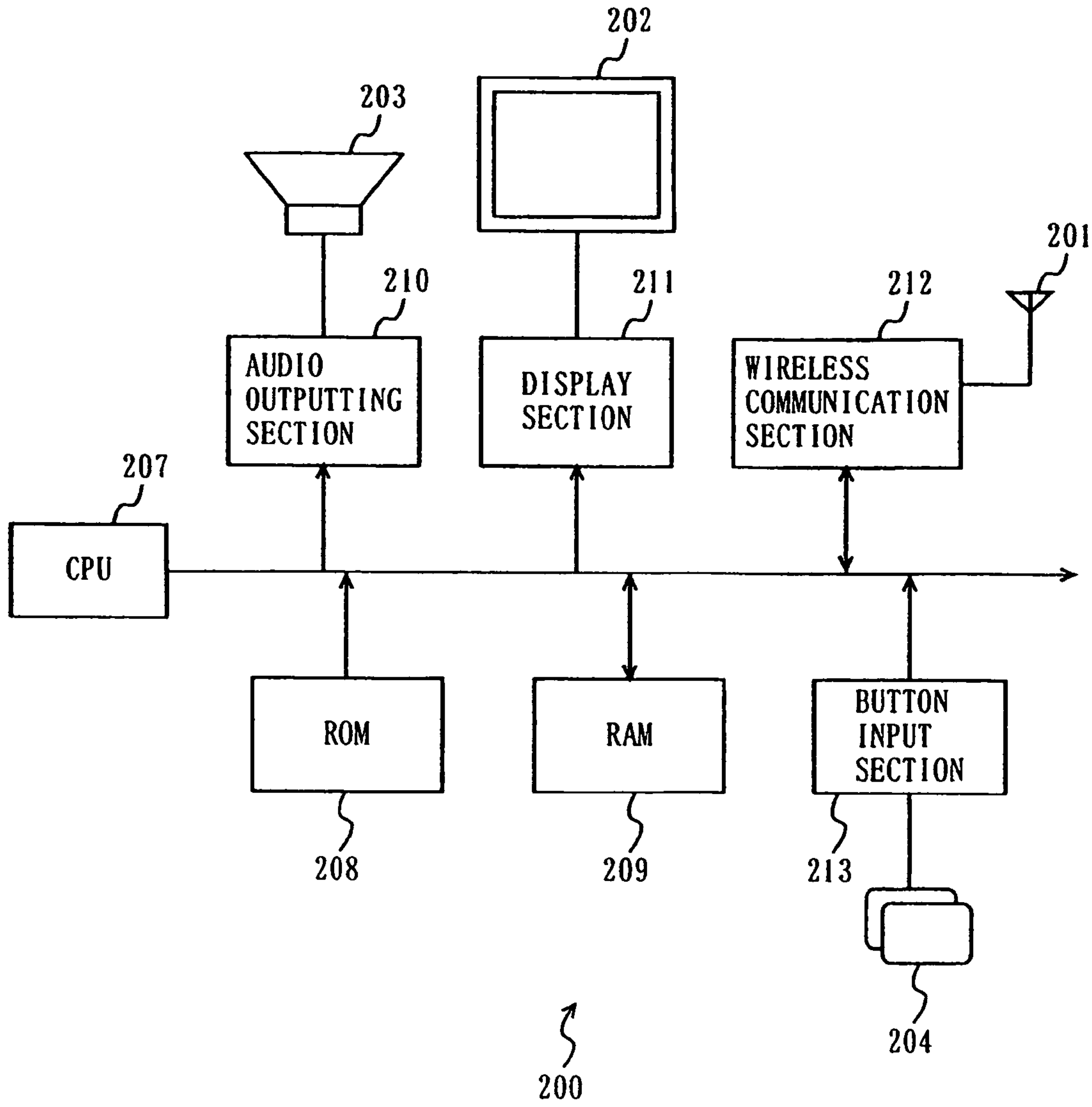
FIG. 16 is a block diagram showing a hardware configuration of the cellular phone 200 shown in FIG. 15.

Next, among the manners of practicing the mobile terminal apparatus according to the present invention, a manner of producing the mobile terminal apparatus will be described. The mobile terminal apparatus according to the present invention can be produced based on an internal structure shown in FIG. 16 ("production u as mentioned herein means an industrial production). FIG. 16 is a diagram showing a hardware configuration of the cellular phone 200. As shown in FIG. 16, the cellular phone 200 comprises a CPU 207, a ROM 208, a RAM 209, an audio outputting section 210, a display section 211, a wireless communication section 212 and a button input section 213, which are connected to one another. Note that FIG. 16 only shows elements which are related to the above-described manner of use.

The ROM 208 stores a software program for providing services, and the CPU 207 executes the program stored in the ROM 208. In response to this execution, the CPU 207 performs a data write or update, as necessitated during the execution, for the RAM 209.

In response to the above execution, towards the user A, the CPU 207 outputs audio to the loudspeaker 203 via the audio outputting section 210, and outputs an image on the screen 202 via the display section 211. By means of the buttons 204 for input purposes which are connected to the button input section 213, key inputs made by the user A are accepted. Communications are performed via the antenna 201 connected to the wireless communication section 212, in order to receive or transmit data necessary for a service.

Figure 17:
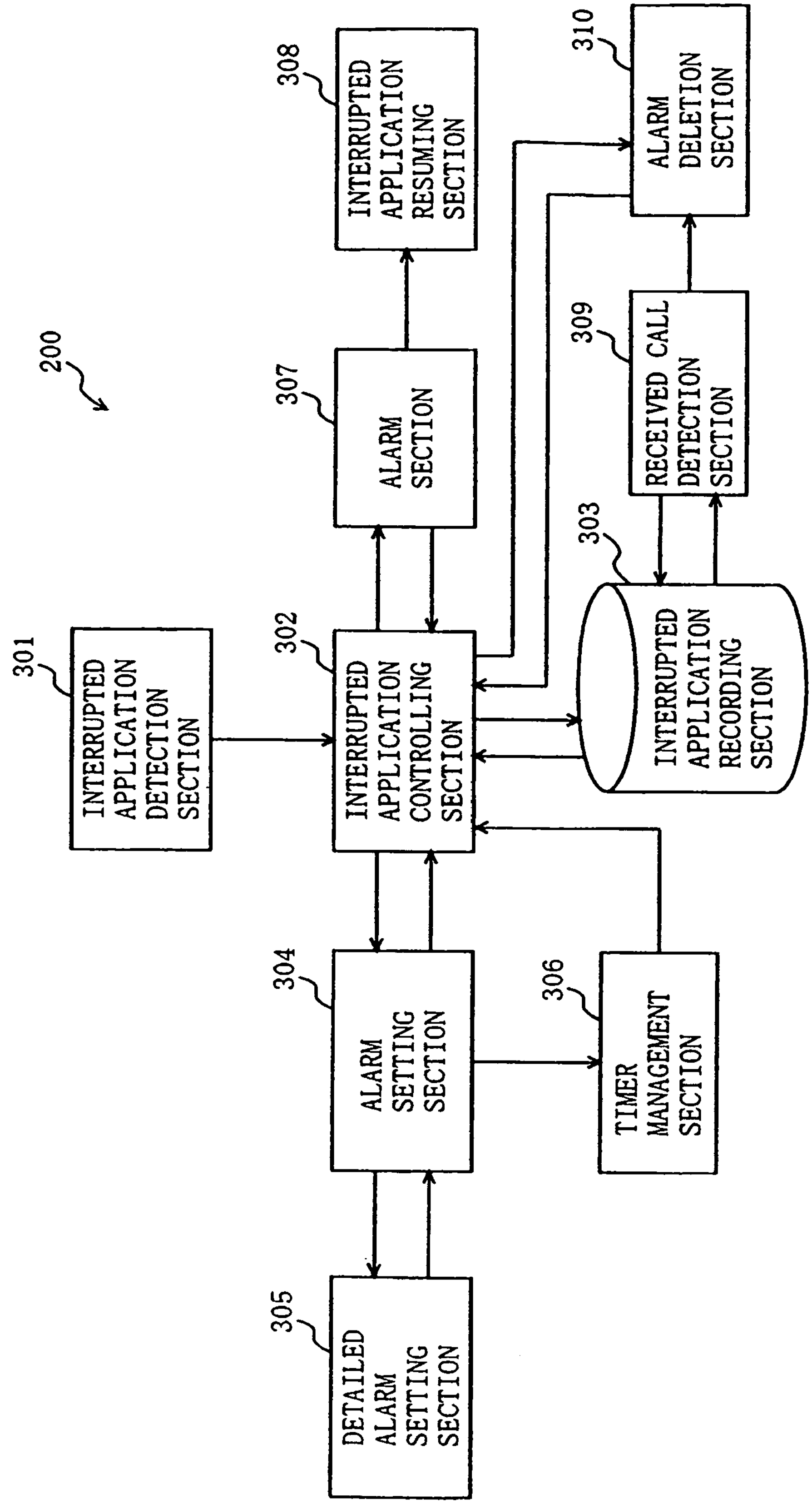
FIG. 17 is a diagram illustrating a software configuration of the cellular phone 200 shown in FIG. 15 and FIG. 16.

The hardware configuration of the mobile terminal apparatus according to the present invention is as above. Now, a software configuration of the mobile terminal apparatus according to the present invention will be described. FIG. 17 is a diagram illustrating a software configuration of the mobile terminal apparatus according to the present invention.

The program stored in the ROM 208 is previously coded so as to realize functions such as "execution of the application", interruption of the application", and "resume of the application". The program stored in the ROM 208 is read by the CPU 207 and thus functions as specific means such as an interrupted application detection section 301, an interrupted application controlling section 302, an interrupted application recording section 303, an alarm setting section 304, a detailed alarm setting section 305, a timer management section 306, an alarm section 307, an interrupted application resuming section 308, a received call detection section 309, and an alarm deletion section 310. When these specific means are allowed to function, the RAM 209 functions as part of the interrupted application recording section 303.

Based on the aforementioned manner of use and manner of production, the processes by the interrupted application detection section 301 to the alarm deletion section 310 will be described below.

Figure 18:
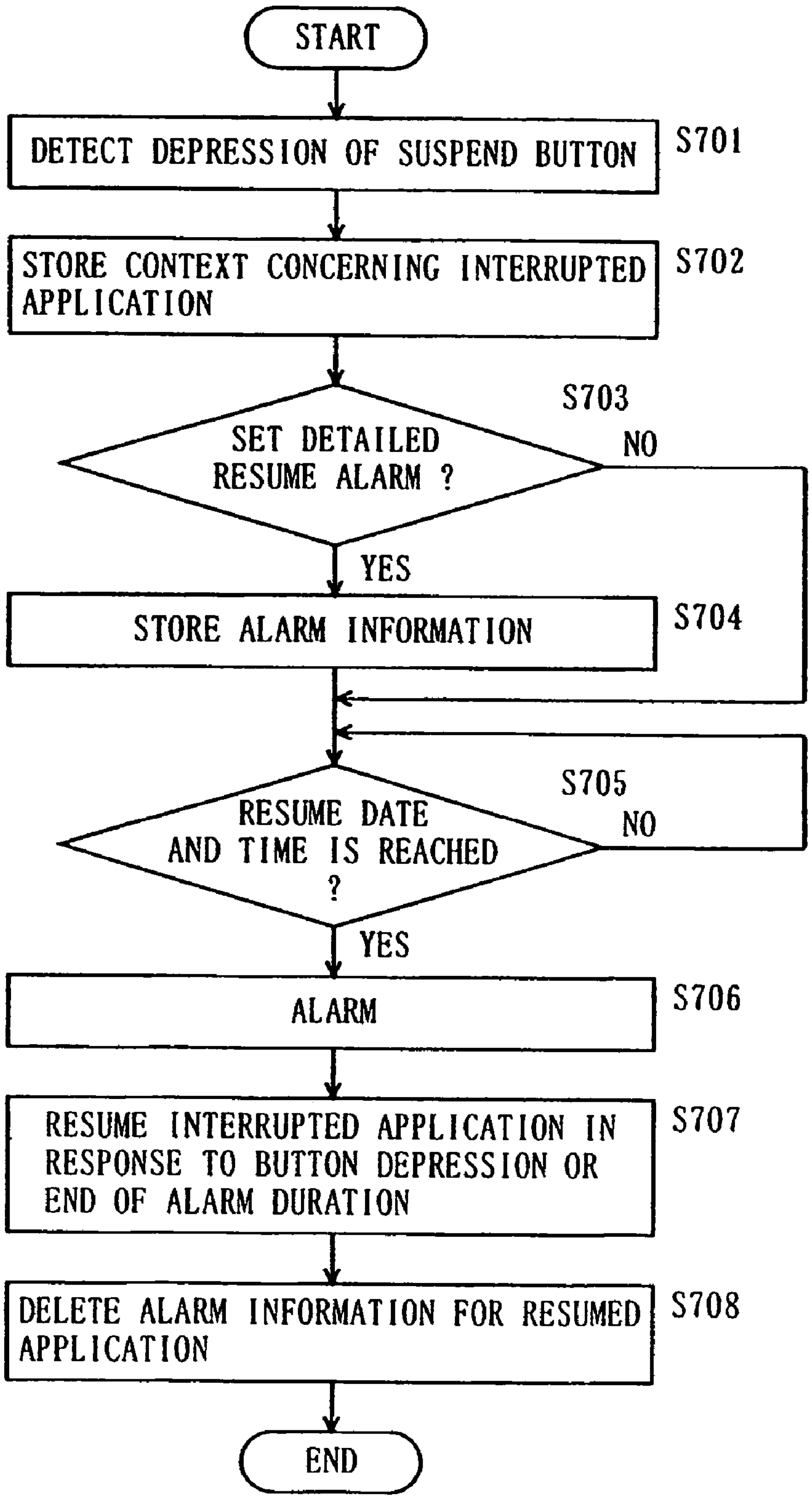
FIG. 18 is a flowchart illustrating an alarm setting procedure when resuming an interrupted application in the cellular phone 200 shown in FIG. 15 and FIG. 16.

First, in accordance with the flowchart of FIG. 18, specific interruption and resume processes of an application will be described. The description will be made by referring to the software configuration shown in FIG. 17, an example screen image of FIG. 19 to be displayed on the screen 202 of the cellular phone 200, and an alarm information data structure show in FIG. 20.

As a specific application, the interruption and resume of an e-mail transmission process by an e-mail application will be described.

Figure 19:
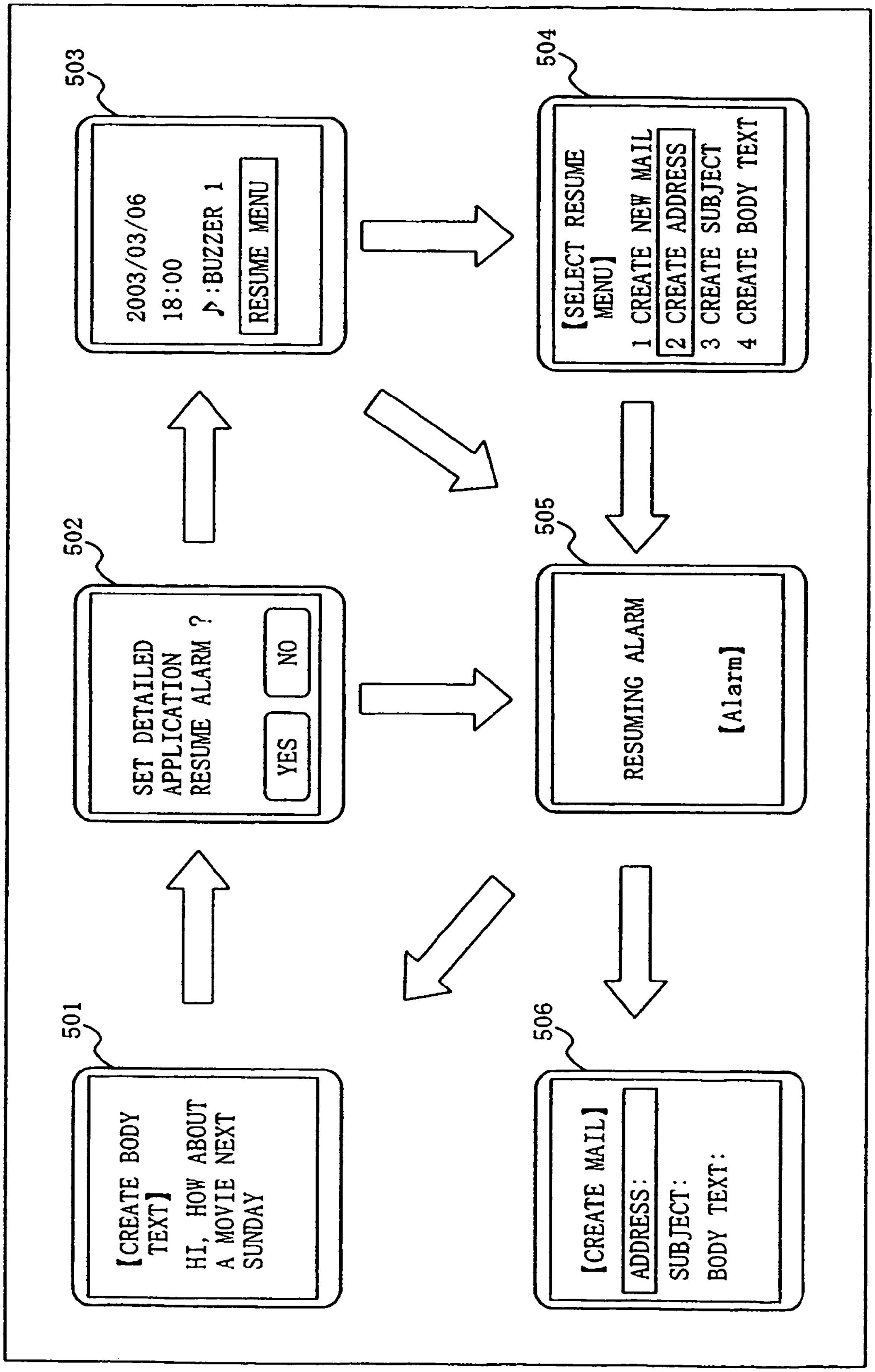
FIG. 19 is a schematic diagram showing transitions in the screen leading to a resume of an interrupted application in the cellular phone 200 shown in FIG. 15 and FIG. 16.

During the execution of the application (specifically, while a body text of an e-mail is being generated, with a screen 501 as shown in FIG. 19 being displayed on the screen 202 of the cellular phone 200), if the user A presses the suspend button 205, the interrupted application detection section 301 detects the depression of the suspend button 205, and a context concerning the application which is being executed is passed to the interrupted application controlling section 302 (step S701).

The interrupted application controlling section 302 stores the received context concerning the application to an alarm information setting table 400 (see FIG. 20) in the interrupted application recording section 303 (step S702).

Now, the structure of the alarm information to be stored to the alarm information setting table 400 will be described. The alarm information is set in the alarm information setting table 400. The alarm information setting table 400 is retained by the interrupted application recording section 303. For each interrupted application, the alarm information setting table 400 retains: an application context 401 identifying the interrupted application; a resuming menu level 402 representing a menu hierarchical level at which the application is to be resumed; an alarming date 403 of an alarm to urge a resume of the application; an alarming time 404 of the same alarm; and an alarming method 405 of the same alarm. Although FIG. 20 employs text sequences to illustrate these setting information for conciseness of description, the setting information may alternatively be managed by using IDs such as numerical values.

In the example of FIG. 20, units of alarm information corresponding to an e-mail application 410, a redial application 411, a schedule application 412, and a telephone directory application 413 are registered.

Having received the application context concerning the application which is being executed (i.e., the context concerning the e-mail application), the interrupted application controlling section 302 secures a record (a storage area extending in the row direction of the alarm information setting table 400) in the alarm information setting table 400, and stores the received application context. This is depicted as "mail context" in the alarm information 410.

Next, the interrupted application controlling section 302 instructs the alarm setting section 304 to display an alarm setting screen. The alarm setting section 304 displays a confirmation screen 502 for urging the user A to choose whether to use alarm information which is previously registered in the cellular phone 200 or allow the user A to set detailed alarm information (step S703).

If the user A selects "NO" on the confirmation message screen 502 by using any of the buttons 204 for input purposes ("N" from step S703), default values are set for the alarm information. Default values for the respective input items may be as follows. The resuming menu level 402, which is a hierarchical level at which the application has been interrupted, is "mail body text inputting" in the exemplary alarm information 410. It is assumed that the alarming date 403 and the alarming time 404 indicate 24 hours after a point in time at which the application was interrupted. In other words, the time and date of interruption is 18:00 on Mar. 5, 2003. The alarming method 405 is set to "buzzer 1".

Note that the default values may be separately set by the user A by using a system setting function or the like in advance. The alarm setting section 304 detects the selection of "NO" by the user A on the confirmation message screen 502, and instructs the timer management section 306 to count down until the alarming time, and passes the alarm information to the interrupted application controlling section 302.

On the other hand, the case where the user A selects "YES" on the confirmation message screen 502 ("Y" from step S703) will be described. Having detected this selection, the alarm setting section 304 instructs the detailed alarm setting section 305 to display a screen 503 and a screen 504 for setting detailed alarm information. The detailed alarm setting section 305 displays the screen 503 to allow the user to input an alarming date 403, an alarming time 404, and an alarming method 405.

If the user A selects a resume menu after the alarming date 403, the alarming time 404, and the alarming method 405 have been set, the resume menu selection screen 504 is displayed on the display screen 202 of the cellular phone 200. Here, the user A is allowed the ability to resume the application by going back to a certain step in the mailing application. For example, if "create address" is selected on the screen 504, then "create address" is set in the resuming menu level 402 of the alarm information, so that the application will be resumed from the "create address" function.

Next, the alarm setting section 304 instructs the timer management section 306 to count down till the alarming time, and passes the alarm information to the interrupted application controlling section 302.

If the user A does not set a resume menu after setting the alarming date 403, the alarming time 404, and the alarming method 405, the resuming menu level is set to a default value. The alarm setting section 304 instructs the timer management section 306 to count down till the alarming time, and passes the alarm information to the interrupted application controlling section 302.

Although the alarming time 404 is designated as a point in time in the above example, an elapsed time since the interruption may alternatively be designated. In this case, the alarming date 403 and the alarming time 404 are to be calculated from the point in time at which the application was interrupted, and such calculated values will be set. The interrupted application controlling section 302 stores the received alarm information to the interrupted application recording section 303 (step S704).

Until reaching the resume date and time of an application, the user A can execute any arbitrary application ("N" from step S705). Once the resume date and time of the application is reached ("Y" from step S705), the timer management section 306 notifies to the interrupted application controlling section 302 that the application resume date and time (resume location information) has been reached. The interrupted application controlling section 302 passes to the alarm section 307 the alarming method 405 and the menu level 402 for the application to be resumed, and instructs the alarm section 307 to ring an alarm. In other words, the interrupted application controlling section 302 solely manages the alarm information which has been generated by the alarm setting section 304, and upon receiving a notice from the timer management section 306 that the application resume time has been reached, gives a resume instruction to an application by referring to the alarm information. The alarm section 307 displays the application resuming alarm screen 505 on the screen 202 of the cellular phone 200, and rings an alarm through the loudspeaker 203 in accordance with the received alarming method 405, thereby alerting the user A (step S706).

After the lapse of an arbitrary alarm duration, the alarm section 307 passes to the interrupted application resuming section 308 the menu level 402 for the application to be resumed, and after instructing it to resume the interrupted application, notifies to the interrupted application controlling section 302 that a resume instruction for the application has been completed. The interrupted application resuming section 308 displays an application screen 506 of the received menu level ("input address" in the example) on the display screen 202 of the cellular phone 200 (step S707).

Finally, having received the notification of completion of the resume instruction for the application, the interrupted application controlling section 302 deletes, from the interrupted application recording section 303, the alarm information pertaining to the application that has been resumed (step S708).

The resume of the application does not need to wait till a set point in time. Alternatively, any arbitrary operation, e.g. depression of the resume button 206, may be detected by the interrupted application controlling section 301 to resume the application. In this case, if there are a plurality of applications that have been interrupted, a process of selecting which application to resume is performed by the interrupted application resuming section 308.

In the case where there are a plurality of applications that have been interrupted, using the same alarm will not allow the user A to know which application's resume is being notified. By employing respectively different alarming methods as in the present embodiment, the user A is enabled to distinguish which application is to be resumed. Furthermore, by varying the types of alarms as in audio and vibration, alarms for different applications can be received at the same time.

FOURTH EMBODIMENT

Figure 21:
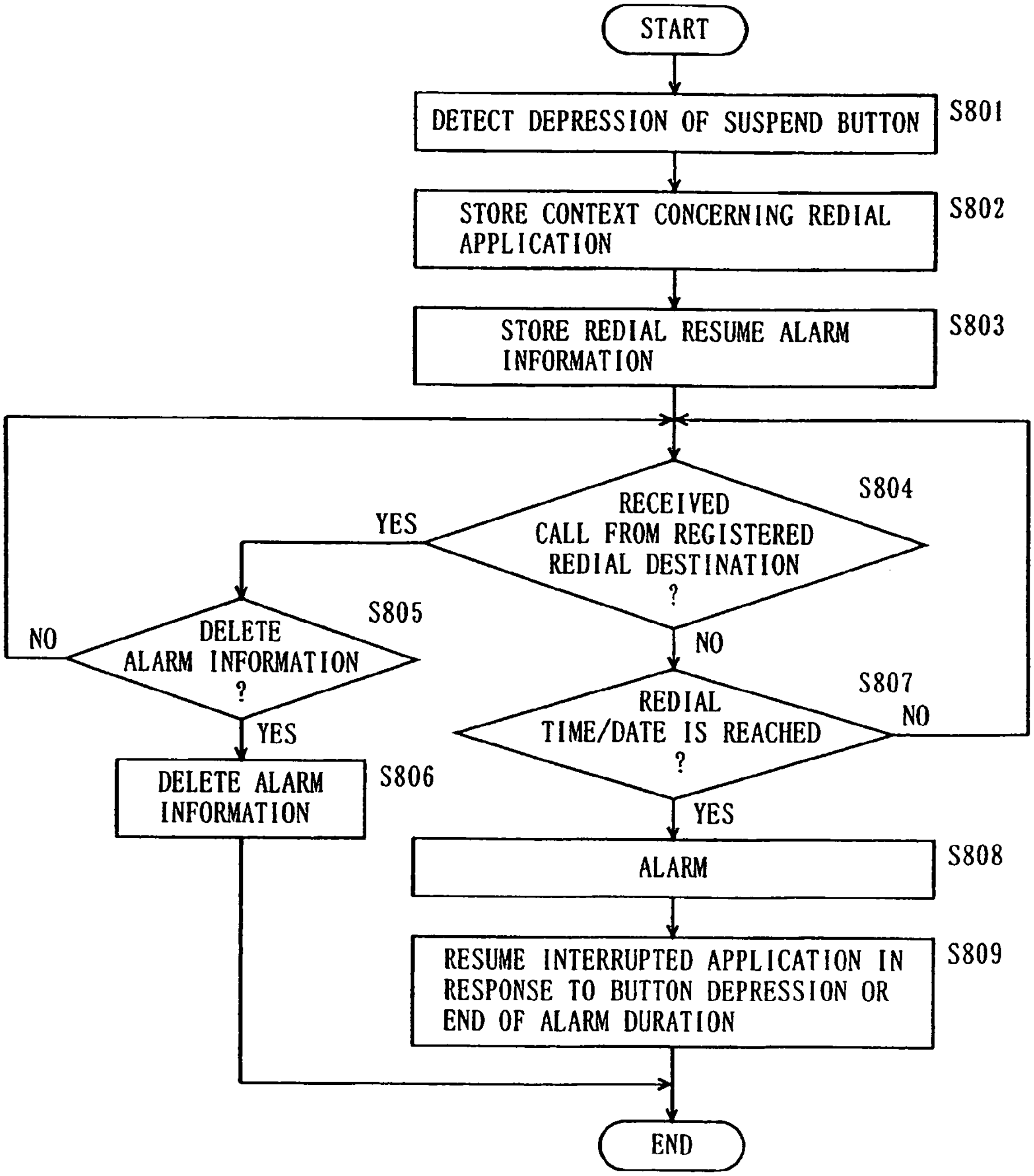
FIG. 21 is a flowchart showing a procedure of deleting redial alarm information in the cellular phone 200 shown in FIG. 15 and FIG. 16.

Next, based on the descriptions of the first embodiment, a case will be described where the user A sets a redial resuming alarm, and a call is received by the cellular phone 200 from a set redial alarm destination, with reference to the flowchart of FIG. 21. The description will be made by referring to the software configuration shown in FIG. 17, and an example screen image of FIG. 22 to be displayed on the screen 202 of the cellular phone 200.

If the user A interrupts a redial application by pressing the suspend button 205, the interrupted application detection section 301 detects the depression of the suspend button 205, and passes a context concerning the redial application to the interrupted application controlling section 302 (step S801).

The interrupted application controlling section 302 stores the received application context to the interrupted application recording section 303 (step S802).

After the user A has set resume alarm information for the interrupted redial application 411 by means of the alarm setting section 304 or the detailed alarm setting section 305, the interrupted application controlling section 302 stores the alarm information to the interrupted application recording section 303 (step S803).

Figure 22:
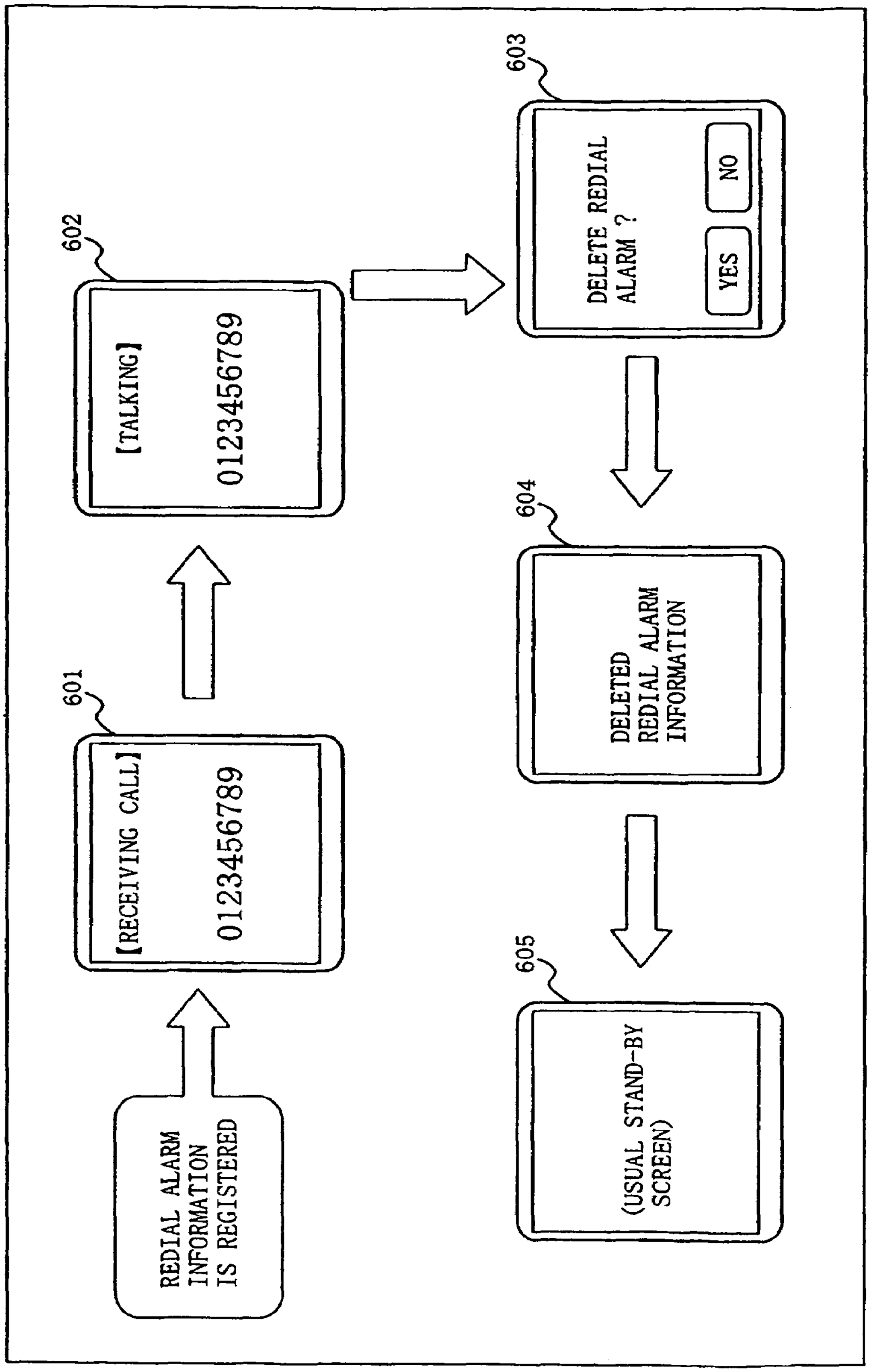
FIG. 22 is a schematic diagram showing transitions in the screen leading to deletion of redial alarm information in the cellular phone 200 shown in FIG. 15 and FIG. 16.

If a call from the set redial alarm destination is received by the cellular phone 200 before reaching the redial application resume time ("Y" from step S804), a screen 601 as shown in FIG. 22 is displayed, for example. If the user A presses an ON button (not shown), a voice call process begins and the screen transitions to the screen 602. At this time, the received call detection section 309 detects the received call, and determines that it is a call received from the set redial alarm destination based on, for example, the number of the caller. When the call is terminated by means of an OFF button (not shown), the received call detection section 309 instructs the alarm deletion section 310 to display a confirmation screen 603 for deleting redial alarm information (step S805).

If the user A selects "NO" by using any of the buttons 204 for input purposes on the confirmation screen 603 for deletion of redial alarm information ("N" from step S805), the redial alarm information is not deleted. When the redial resume time as set by the user A is reached, the alarm section 307 rings an alarm (step S808), and the interrupted application resuming section 308 resumes the redial application. The interrupted application controlling section 302 deletes the resumed redial alarm information from the interrupted application recording section 303 (step S809).

If the user A selects "YES" by using any of the buttons 204 for input purposes on the confirmation screen 603 for deletion of redial alarm information ("Y" from step S805), the alarm deletion section 310 passes data concerning the received call to the interrupted application controlling section 302, and instructs the interrupted application controlling section 302 to delete the corresponding redial alarm information 411. Within the alarm information setting table 400 stored in the interrupted application recording section 303, the interrupted application controlling section 302 deletes the relevant redial alarm information 411, notifies completion of the deletion to the alarm deletion section 310, and instructs the alarm deletion section 310 to display a deletion_completed screen 604 on the display screen 202 of the cellular phone 200. The alarm deletion section 310 displays the deletion_completed screen 604 on the display screen 202, and ten seconds later, displays a usual stand-by screen 605 for the cellular phone 200 on the display screen 202 of the cellular phone 200 (step S806).

Although the period of time for the alarm deletion section 310 to switch from the deletion_completed screen 604 to the usual stand-by screen for the cellular phone 200 is illustrated as ten seconds in the above example, the displayed time may be arbitrary because the deletion confirmation screen 604 only needs to be able to be confirmed by the user A.

As in the first embodiment, the mobile terminal apparatuses 200 according to the third and fourth embodiments are also applicable to digital equipment such as PDAs (Personal Digital Assistants) with a telephone function, digital cameras with a telephone function, or car navigation systems with a telephone function. Otherwise, the present mobile terminal apparatuses 200 are also applicable to digital equipment capable of accessing the Internet.

In the description of the third and fourth embodiments, it is assumed that each application is stored in the ROM 208, although not limited thereto. Each application may be distributed in a recorded form on a distribution medium such as a CD-ROM, or may be distributed through a network such as the Internet.

In the third and fourth embodiments, each application may be distributed in a recorded form on a distribution medium, or may be distributed through a network, as is the case with the voice calling program P1.

As described in the first embodiment, those functions realized by each application and elements of the mobile terminal apparatus 200 of the third and fourth embodiments which are appropriately selected may be implemented as an integrated circuit.

While the invention has been described in detail, the foregoing description is in all aspects illustrative and not restrictive. It is understood that numerous other modifications and variations can be devised without departing from the scope of the invention.

INDUSTRIAL APPLICABILITY

The mobile terminal apparatus according to the present invention is suitable for applications such as digital equipment capable of making voice calls, which would call for the technological effect of making it easy to remember the reason why a communication in the past was made. Otherwise, the mobile terminal apparatus according to the present invention is suitable for applications such as digital equipment capable of accessing the Internet, which would call for the technological effect of making it easy for a user to remember the reason why a connection was made.

What is claimed is:

1. A mobile terminal apparatus capable of executing an application and performing a communication related to the application, comprising:

- a first acquisition section operable to acquire resume information concerning an application which is being executed;
- a second acquisition section operable to acquire identification information, which is selected by a user, related to the application which is being executed, the identification information identifying a communications device communicating with the mobile terminal apparatus;
- a communication processing section operable to perform a communication with the communications device by using the identification information acquired by the second acquisition section;
- a determination section operable to determine whether the communication by the communication processing section has been interrupted;
- a generation section operable to, if the determination section determines that the communication by the communication processing section has been interrupted, generate interruption information including the identification information;
- a storage section operable to store the interruption information and the resume information concerning the application related to the interrupted communication, such that the interruption information and the resume information are stored in association with each other;
- a display section operable to display a history of interrupted communications based on the stored interruption information; and a reactivation section operable to, if the interrupted communication is instructed to be resumed, resume the communication based on the stored interruption information and reactivate the application based on the resume information associated with the interruption information, the resume and the reactivation being performed in conjunction with each other.

2. The mobile terminal apparatus according to claim 1, wherein, the interruption information comprises auxiliary information concerning the application related to the interrupted communication, and the display section displays the history of interrupted communications together with the auxiliary information.

3. The mobile terminal apparatus according to claim 1, wherein, the interruption information comprises auxiliary information concerning the interrupted communication, and the display section displays the history of interrupted communications together with the auxiliary information.

4. The mobile terminal apparatus according to claim 2, wherein the auxiliary information includes a time concerning the interrupted communication, and/or a place where the communication was interrupted.

5. The mobile terminal apparatus according to claim 4, further comprising a timer section operable to keep a current time, wherein the generation section is operable to generate the interruption information comprising the auxiliary information, the auxiliary information representing a point in time at which the communication processing section began processing, based on the current time kept by the timer section.

6. The mobile terminal apparatus according to claim 4, further comprising:

a timer section operable to keep a current time; and an input section to be operated by the user in order to interrupt the communication performed by the communication processing section, wherein the generation section is operable to generate the interruption information comprising the auxiliary information, the auxiliary information representing a time spent from the beginning of the processing by the communication processing section until the interruption of the processing in response to the input section being operated, based on the current time kept by the timer section.

7. The mobile terminal apparatus according to claim 4, further comprising a locating section operable to acquire a current location, wherein the generation section is operable to generate the interruption information comprising the auxiliary information, the auxiliary information representing a place at which the processing by the communication processing was interrupted, based on the current location acquired by the locating section.

8. The mobile terminal apparatus according to claim 1, wherein, in accordance with the resume information stored in the storage section, the reactivation section reactivates the application from a state which existed immediately before the interruption of the processing by the communication processing section.

9. The mobile terminal apparatus according to claim 1, wherein, in accordance with the resume information stored in the storage section, the reactivation section reactivates the application anew from the beginning.

10. The mobile terminal apparatus according to claim 1, wherein, the determination section is operable to determine whether a connecting process with the communications device has been interrupted, and the generation section is operable to generate the interruption information if the determination section determines that the connecting process has been interrupted.

11. The mobile terminal apparatus according to claim 1, wherein, the determination section determines whether a voice communication process with the communications device has been interrupted, and the generation section is operable to generate the interruption information if the determination section determines that the voice communication process has been interrupted.

12. A method for executing an application and performing a communication related to the application on a mobile terminal apparatus, comprising:

a first acquisition step of acquiring resume information concerning an application which is being executed;

a second acquisition step of acquiring identification information, which is selected by a user, related to the application which is being executed, the identification information identifying a communications device communicating with the mobile terminal apparatus;

a communication processing step of performing a communication with the communications device by using the identification information acquired in the second acquisition step;

a determination step of determining whether the communication in the communication processing step has been interrupted;

a generation step of, if it is determined in the determination step that the communication in the communication processing step has been interrupted, generating interruption information including the identification information;

a storage step of storing the interruption information and the resume information concerning the application related to the interrupted communication, such that the interruption information and the resume information are stored in association with each other;

a displaying step of displaying a history of interrupted communications based on the stored interruption information; and a reactivation step of, if the interrupted communication is instructed to be resumed, resuming the communication based on the stored interruption information and reactivating the application based on the resume information associated with the interruption information, the resume and the reactivation being performed in conjunction with each other.

13. A computer program executed by a mobile terminal apparatus capable of executing an application and performing a communication related to the application, comprising:

a first acquisition step of acquiring resume information concerning an application which is being executed;

a second acquisition step of acquiring identification information, which is selected by a user, related to the application which is being executed, the identification information identifying a communications device communicating with the mobile terminal apparatus;

a communication processing step of performing a communication with the communications device by using the identification information acquired in the second acquisition step;

a determination step of determining whether the communication in the communication processing step has been interrupted; and a generation step of, if it is determined in the determination step that the communication in the communication processing step has been interrupted, generating interruption information including the identification information, wherein, the interruption information and the resume information concerning the application related to the interrupted communication are stored in a storage device comprised by the mobile terminal apparatus, such that the interruption information and the resume information are stored in association with each other, and based on the stored interruption information, a history of interrupted communications is displayed on a display device comprised by the mobile terminal apparatus, the computer program further comprising:

a reactivation step of, if the interrupted communication is instructed to be resumed, resuming the communication based on the stored interruption information and reactivating the application based on the resume information associated with the interruption information, the resume and the reactivation being performed in conjunction with each other.

14. The computer program according to claim 13 recorded on a recording medium.

15. An integrated circuit mountable to a mobile terminal apparatus capable of executing an application and performing a communication related to the application, the integrated circuit comprising:

a first acquisition section operable to acquire resume information concerning an application which is being executed;

a second acquisition section operable to acquire identification information, which is selected by a user, related to the application which is being executed, the identification information identifying a communications device communicating with the mobile terminal apparatus;

a communication processing section operable to perform a communication with the communications device by using the identification information acquired by the second acquisition section;

a determination section operable to determine whether the communication by the communication processing section has been interrupted; and a generation section operable to, if the determination section determines that the communication by the communication processing section has been interrupted, generate interruption information including the identification information, wherein, the interruption information and the resume information concerning the application related to the interrupted communication are stored in a storage device comprised by the mobile terminal apparatus, such that the interruption information and the resume information are stored in association with each other, and based on the stored interruption information, a history of interrupted communications is displayed on a display device comprised by the mobile terminal apparatus, the integrated circuit further comprising:

a reactivation section operable to, if the interrupted communication is instructed to be resumed, resume the communication based on the interruption information stored in the storage device and reactivate the application based on the resume information associated with the interruption information, the resume and the reactivation being performed in conjunction with each other.

* * * * *

UNITED STATES PATENT AND TRADEMARK OFFICE

CERTIFICATE OF CORRECTION

PATENT NO. : 7,024,206 B2
APPLICATION NO. : 10/516359
DATED : April 4, 2006
INVENTOR(S) : Ayaka Hamanaga et al.

It is certified that error appears in the above-identified patent and that said Letters Patent is hereby corrected as shown below:

On Title Page, col. 2 Item (56)

References Cited, under the "FOREIGN PATENT DOCUMENTS" heading, please correct the first listed reference to read as follows:

| | | |
|---|---|---|
| EP | 0 895 393 | 2/1999 |

Signed and Sealed this

First Day of August, 2006

JON W. DUDAS
*Director of the United States Patent and Trademark Office*